(12) United States Patent
Takagi

(10) Patent No.: US 11,747,763 B2
(45) Date of Patent: Sep. 5, 2023

(54) DRIVE DEVICE AND IMAGE FORMING APPARATUS INCORPORATING THE DRIVE DEVICE

(71) Applicant: Hiroaki Takagi, Kanagawa (JP)

(72) Inventor: Hiroaki Takagi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/697,434

(22) Filed: Mar. 17, 2022

(65) Prior Publication Data

US 2022/0308517 A1    Sep. 29, 2022

(30) Foreign Application Priority Data

Mar. 25, 2021   (JP) ................. 2021-051170

(51) Int. Cl.
*G03G 15/00* (2006.01)
*G03G 21/16* (2006.01)
(Continued)

(52) U.S. Cl.
CPC .......... *G03G 15/757* (2013.01); *F16D 1/108* (2013.01); *F16D 3/06* (2013.01); *G03G 21/1647* (2013.01); *G03G 21/186* (2013.01)

(58) Field of Classification Search
CPC ............. G03G 15/757; G03G 21/1647; G03G 21/1857; G03G 21/186; G03G 21/1864; G03G 2221/1657; F16D 1/108; F16D 3/06
See application file for complete search history.

(56) References Cited

U.S. PATENT DOCUMENTS

2006/0268081 A1    11/2006  Sugata
2011/0217073 A1     9/2011  He
(Continued)

FOREIGN PATENT DOCUMENTS

CN    109407484 A    3/2019
EP    2990876 A1     3/2016
(Continued)

OTHER PUBLICATIONS

Machine translation of JP 2017-207565 A (published on Nov. 24, 2017) printed on Feb. 2, 2023.*
(Continued)

*Primary Examiner* — Sophia S Chen
(74) *Attorney, Agent, or Firm* — Harness, Dickey & Pierce, P.L.C.

(57) ABSTRACT

A drive device that drives a detachable unit detachably attached to an image forming apparatus includes a drive coupling, a rotary shaft, a relay member, a contact member, and a compression spring. The drive coupling contacts and separate from a driven coupling of the detachable unit along with movement of the detachable unit. The relay member transmits rotation force of the rotary shaft to the drive coupling to rotate together. The compression spring has an axial end contacting the contact member disposed away from the driven coupling from the relay member and another axial end contacting the relay member. The drive coupling includes an outer circumferential restrictor restricts radial movement of the compression spring. The relay member includes an inner circumferential restrictor restricts radial movement of the compression spring.

20 Claims, 15 Drawing Sheets

(51) Int. Cl.
*G03G 21/18* (2006.01)
*F16D 1/00* (2006.01)
*F16D 1/108* (2006.01)
*F16D 3/06* (2006.01)

(56) References Cited

U.S. PATENT DOCUMENTS

2016/0062300 A1    3/2016  Takagi et al.
2021/0310549 A1*  10/2021  Mizuno .............. G03G 21/1647

FOREIGN PATENT DOCUMENTS

JP      2016-048364        4/2016
JP     2017207565 A   *  11/2017

OTHER PUBLICATIONS

Extended European Search Report dated Aug. 18, 2022 issued in corresponding European Appln. No. 22162664.1.

* cited by examiner

PRIOR ART

DRIVE DEVICE AND IMAGE FORMING APPARATUS INCORPORATING THE DRIVE DEVICE

CROSS-REFERENCE TO RELATED APPLICATION

This patent application is based on and claims priority pursuant to 35 U.S.C. § 119(a) to Japanese Patent Application No. 2021-051170, filed on Mar. 25, 2021, in the Japan Patent Office, the entire disclosure of which is hereby incorporated by reference herein.

BACKGROUND

Technical Field

Embodiments of the present disclosure relate to a drive device and an image forming apparatus incorporating the drive device. The drive device drives a detachable unit, e.g., a fixing device or a process cartridge, that is detachably attached to a housing of the image forming apparatus.

Background Art

As known in the art, various image forming apparatuses include a drive device that drives a detachable unit, e.g., a fixing device or a process cartridge, that is detachably attached to the housing of the image forming apparatus.

Such a drive device includes a drive coupling that engages with a driven coupling of the detachable unit along with attachment of the detachable unit to the housing of the image forming apparatus. The driving force of a drive motor included in the housing of the image forming apparatus is transmitted to the driven coupling via the drive coupling to drive the detachable unit.

In such a drive device, when the detachable unit is attached to the housing of the image forming apparatus and the driven coupling is not fitted to the drive coupling due to the posture in the rotational direction of the driven coupling of the detachable unit and the posture of the drive coupling of the housing of the image forming apparatus, the drive coupling is pushed in the axial direction by the driven coupling so as to slide on a rotary shaft against the biasing force of a compression spring wound around the rotary shaft (on which the drive coupling is mounted). Then, as the rotational driving of the drive coupling is started, the drive coupling is brought to a posture in the rotational direction to fit to the driven coupling. Then, the drive coupling moves in the axial direction by the biasing force of the compression spring to be fitted to the driven coupling.

On the other hand, with another technique, a detachable unit is attached to the housing of the image forming apparatus and another member is included to hold a compression spring when the drive coupling is pressed to move in the axial direction by the driven coupling.

SUMMARY

Embodiments of the present disclosure described herein provide a novel drive device to drive a detachable unit detachably attached to an image forming apparatus and including a drive coupling, a rotary shaft, a relay member, a contact member, and a compression spring. The drive coupling contacts and separates from a driven coupling of the detachable unit along with movement of attachment and detachment of the detachable unit with respect to the image forming apparatus. The relay member is inserted into an opening of the drive coupling and secured on the rotary shaft. The relay member transmits rotation force of the rotary shaft to the drive coupling to cause the drive coupling to rotate together with the rotary shaft. The contact member is disposed away from the driven coupling from the relay member. The compression spring is wound around the rotary shaft and has an axial end contacting the contact member and another axial end contacting the relay member. The compression spring biases the drive coupling toward an axial end of the drive coupling in response to movement of the drive coupling toward another axial end of the drive coupling, with respect to the relay member. The drive coupling includes an outer circumferential restrictor. The outer circumferential restrictor faces an outer circumference of the compression spring to restrict radial movement of the compression spring. The relay member includes an inner circumferential restrictor. The inner circumferential restrictor faces an inner circumference of the compression spring to restrict radial movement of the compression spring in the radial direction.

Further, embodiments of the present disclosure described herein provide an image forming apparatus including a housing, the above-described drive device to drive the detachable unit, and the above-described detachable unit detachably attached to the image forming apparatus.

Further, embodiments of the present disclosure described herein provide a drive device to drive a detachable unit detachably attached to an image forming apparatus and includes a drive coupling, a rotary shaft, and a relay member. The drive coupling contacts and separates from a driven coupling of the detachable unit along with movement of attachment and detachment of the detachable unit with respect to the image forming apparatus. The relay member is inserted into an opening of the drive coupling and secured on the rotary shaft. The relay member transmits rotation force of the rotary shaft to the drive coupling to cause the drive coupling to rotate together with the rotary shaft. The relay member includes a first drive transmitting portion to contact the drive coupling. The drive coupling includes a second drive transmitting portion to contact the driven coupling. A distance from the second drive transmitting portion to an axial center of the rotary shaft is longer than a distance from the first drive transmitting portion to the axial center of the rotary shaft.

Further, embodiments of the present disclosure described herein provide an image forming apparatus including a housing, the above-described drive device to drive the detachable unit, and the above-described detachable unit detachably attached to the image forming apparatus.

BRIEF DESCRIPTION OF THE SEVERAL VIEWS OF THE DRAWINGS

Exemplary embodiments of this disclosure will be described in detail based on the following figures, wherein.

Figure 1:
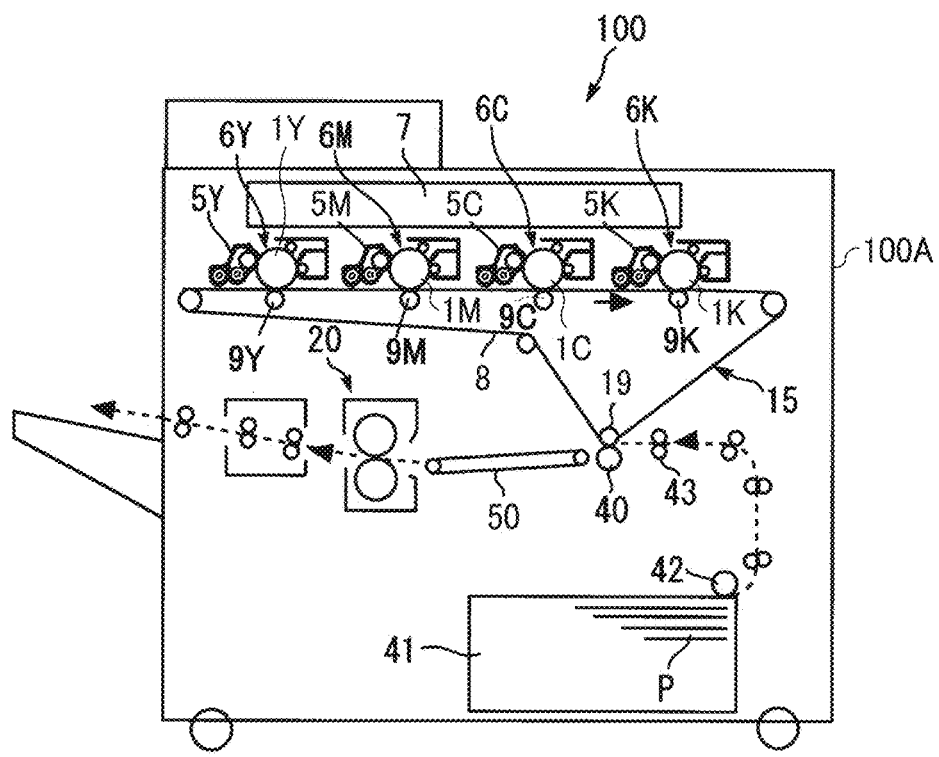
FIG. 1 is a diagram illustrating an overall configuration of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

It will be understood that if an element or layer is referred to as being "on," "against," "connected to" or "coupled to" another element or layer, then it can be directly on, against, connected or coupled to the other element or layer, or intervening elements or layers may be present. In contrast, if an element is referred to as being "directly on," "directly connected to" or "directly coupled to" another element or layer, then there are no intervening elements or layers present. Like numbers referred to like elements throughout. As used herein, the term "and/or" includes any and all combinations of one or more of the associated listed items.

Spatially relative terms, such as "beneath," "below," "lower," "above," "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

The terminology used herein is for describing particular embodiments and examples and is not intended to be limiting of exemplary embodiments of this disclosure. As used herein, the singular forms "a," "an," and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Referring now to the drawings, embodiments of the present disclosure are described below. In the drawings for explaining the following embodiments, the same reference codes are allocated to elements (members or components) having the same function or shape and redundant descriptions thereof are omitted below.

Next, a description is given of a configuration and functions of a drive device and an image forming apparatus incorporating the drive device, according to an embodiment of the present disclosure, with reference to drawings. It is to be noted that identical parts are given identical reference numerals and redundant descriptions are summarized or omitted accordingly.

Figure 2:
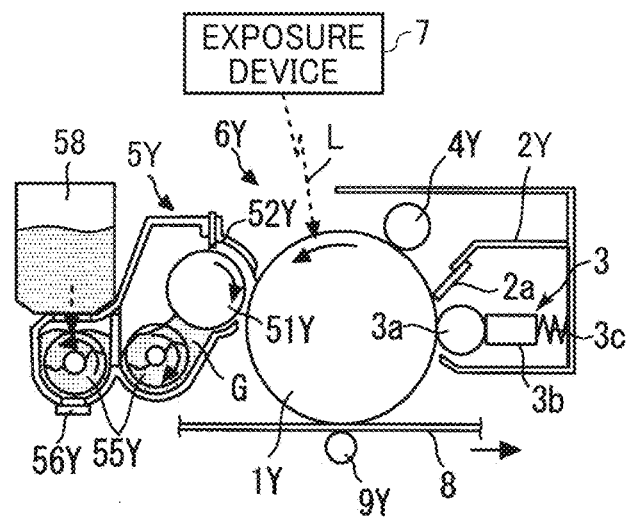
FIG. 2 is a diagram illustrating a configuration of an image forming device of the image forming apparatus in FIG. 1.

Initially with reference to FIGS. 1 and 2, a description is given of the overall configuration and operation of an image forming apparatus 100 according to an embodiment of the present disclosure.

FIG. 1 is a diagram illustrating an overall configuration of a printer, hereinafter, an image forming apparatus according to an embodiment of the present disclosure.

FIG. 2 is an enlarged view of a configuration of an image forming device of the image forming apparatus in FIG. 1.

As illustrated in FIG. 1, an intermediate transfer belt device 15 is disposed in the center of the housing 100A of an image forming apparatus 100. Process cartridges 6Y, 6M, 6C, and 6K corresponding to different colors of yellow, magenta, cyan, and black, respectively, are aligned in parallel to face an intermediate transfer belt 8 of the intermediate transfer belt device 15. These process cartridges 6Y, 6M, 6C, and 6K are detachably attached to (replaceably installed in) the housing 100A of the image forming apparatus 100.

Referring to FIG. 2, the process cartridge 6Y that forms a yellow toner image includes a photoconductor drum 1Y, a charger 4Y, a developing device 5Y, a cleaner 2Y, a lubricant supplier 3, and a charge neutralizer. The photoconductor drum 1Y is a drum-shaped photoconductor that functions as an image bearer. The charger 4Y, the developing device 5Y, the cleaner 2Y, the lubricant supplier 3, and the charge neutralizer are image forming components disposed around the photoconductor drum 1Y. Image forming processes, namely, charging process, exposure process, development process, transfer process, cleaning process, and charge neutralizing process, are performed on the photoconductor drum 1Y, and thus a yellow toner image is formed on the surface of the photoconductor drum 1Y.

Note that the process cartridges 6M for magenta, 6C for cyan, and 6K for black have substantially the same configurations as the process cartridge 6Y for yellow, except the color of toner employed in each process cartridge. The process cartridges 6Y, 6M, 6C, and 6K perform the same series of image forming processes to form toner images of the respective colors. A description is now given of the series of image forming processes performed by the process cartridge 6Y to form the yellow toner image, as a representative of the process cartridges 6M, 6C, and 6K.

With reference to FIG. 2, the photoconductor drum 1Y is rotated by a drive motor counterclockwise in FIG. 2. On the other hand, a charging bias is applied to the charger 4Y by a power source. The surface of the photoconductor drum 1Y is uniformly charged at a position opposite (facing) the charger 4Y in the charging process.

The photoconductor drum 1Y is rotated further and reaches a position opposite (facing) an exposure device 7, where the surface of the photoconductor drum 1Y is irradiated with laser light L emitted from the exposure device 7 and scanned in a width direction, which is a main scanning direction perpendicular to the surface of the paper on which FIGS. 1 and 2 are drawn. Thus, the exposure device 7 forms or writes an electrostatic latent image (exposure potential) corresponding to yellow on the surface of the photoconductor drum 1Y in the exposure process.

When the surface of the photoconductor drum 1Y reaches a position opposite (facing) the developing device 5Y, the electrostatic latent image is developed with toner into a yellow toner image in the development process.

When the surface of the photoconductor drum 1Y bearing the toner image reaches a position opposite (facing) a primary transfer roller 9Y via the intermediate transfer belt 8, the toner image on the surface of the photoconductor drum 1Y is transferred onto the surface of the intermediate transfer belt 8 at the position in the primary transfer process. After the primary transfer process, a certain amount of residual toner (untransferred toner) remains on the photoconductor drum 1Y.

Thereafter, the photoconductor drum 1Y is rotated further and reaches a position opposite (facing) the cleaner 2Y, where the residual toner (untransferred toner) on the surface of the photoconductor drum 1Y is collected by a cleaning blade 2a into the cleaner 2Y in the cleaning process.

Inside the cleaner 2Y is the lubricant supplier 3 serving as a lubricant supplier for a photoconductor drum. The lubricant supplier 3 includes a lubricant supply roller 3a, a solid lubricant 3b, and a compression spring 3c. While rotating clockwise in FIG. 2, the lubricant supply roller 3a gradually scrapes the solid lubricant 3b off to supply the lubricant to the surface of the photoconductor drum 1Y.

The photoconductor drum 1Y is rotated further and finally reaches a position opposite (facing) the charge neutralizer, where the residual potential is removed from the surface of the photoconductor drum 1Y in the charge neutralizing process.

Thus, the series of image forming processes performed on the surface of the photoconductor drum 1Y is completed.

Note that the process cartridges 6M, 6C, and 6K perform the series of image forming processes described above in substantially the same manner as the process cartridge 6Y. That is, the exposure device 7 disposed above the process cartridges 6M, 6C, and 6K irradiates the photoconductor drums 1M, 1C, and 1K of the process cartridges 6M, 6C, and 6K, respectively, with laser light L according to image data.

After the exposure device 7 irradiates the photoconductor drums 1M, 1C, and 1K, developing devices 5M, 5C, and 5K develop electrostatic latent images into visible magenta, cyan, and black toner images, respectively, in the development process. The magenta, cyan, and black toner images respectively formed on the photoconductor drums 1M, 1C, and 1K are primarily transferred onto the intermediate transfer belt 8 such that the magenta, cyan, and black toner images are superimposed one atop another. Thus, a color toner image is formed on the intermediate transfer belt 8.

The intermediate transfer belt 8 serving as an image bearer is entrained around and supported by multiple rollers and is formed into an endless loop. As a drive motor drives and rotates a drive roller of each of the multiple rollers, the intermediate transfer belt 8 is rotated in a direction indicated by arrow in FIG. 1.

Each of four primary transfer rollers 9Y, 9M, 9C, and 9K sandwich the intermediate transfer belt 8 with the corresponding one of the photoconductor drums 1Y, 1M, 1C, and 1K to form an area of contact, herein called a primary transfer nip region, between the intermediate transfer belt 8 and the corresponding one of the photoconductor drums 1Y, 1M, 1C, and 1K. Each of the primary transfer rollers 9Y, 9M, 9C, and 9K is supplied with a transfer voltage (i.e., a primary transfer bias) having a polarity opposite a polarity of toner. The intermediate transfer belt 8 travels in a direction indicated by arrow in FIG. 1 while successively passing through the primary transfer nip regions formed between the primary transfer rollers 9Y, 9M, 9C, and 9K and the photoconductor drums 1Y, 1M, 1C, and 1K, respectively. Thus, the toner images formed on the respective photoconductor drums 1Y, 1M, 1C, and 1K are primarily transferred onto the intermediate transfer belt 8 while being superimposed one atop another to form a composite color toner image on the intermediate transfer belt 8 in the primary transfer process.

Subsequently, the intermediate transfer belt 8 to which the superimposed toner images of yellow, cyan, magenta, and black have been transferred reaches a position opposite (facing) the secondary transfer roller 40. At this position, a secondary transfer counter roller 19 sandwiches the intermediate transfer belt 8 with the secondary transfer roller 40 to form an area of contact, herein called a secondary transfer nip region. At the secondary transfer nip region, the composite color toner image (or four-color toner image) is secondarily transferred from the intermediate transfer belt 8 onto a sheet P serving as a recording medium conveyed to the secondary transfer nip region, in a secondary transfer process. At this time, a small amount of toner may remain untransferred on the intermediate transfer belt 8 as untransferred toner or residual toner.

The surface of the intermediate transfer belt 8 then reaches a position opposite (facing) the belt cleaning device. At this position, the intermediate transfer cleaning device extraneous matter such as the residual toner adhering to the surface of the intermediate transfer belt 8.

Thus, a series of transfer processes performed on the surface of the intermediate transfer belt 8 is completed.

Referring back to FIG. 1, the sheet P is conveyed from a sheet feeding device 41 disposed in a lower portion of the housing 100A of the image forming apparatus 100 to the secondary transfer nip region via a sheet feed roller 42 and a registration roller pair 43, for example.

Specifically, the sheet feeding device 41 contains a stack of multiple sheets P (plurality of sheets P) such as sheets of paper stacked on one on another. The sheet feed roller 42 is rotated counterclockwise in FIG. 1 to pick up and feed an uppermost sheet P of the plurality of sheets P toward between rollers of the registration roller pair 43 via a conveyance passage.

The sheet P thus conveyed to the registration roller pair 43 serving as a timing roller pair temporarily stops at an area of contact, herein called a roller nip region, between the rollers of the registration roller pair 43 that stops rotating. Rotation of the registration roller pair 43 is timed to convey the sheet P toward the secondary transfer nip region such that the sheet P meets the color toner image on the intermediate transfer belt 8 at the secondary transfer nip region. Thus, the desired color image is transferred onto the sheet P.

The sheet P bearing the color toner image transferred at the secondary transfer nip region is then conveyed to the position of the fixing device 20 serving as a detachable unit by a conveyance belt 50. At this position in the fixing device 20, the color toner image is fixed onto the sheet P by application of heat and pressure from a fixing roller and a pressure roller in a fixing process.

Thereafter, the sheet P bearing the fixed toner image is conveyed through the conveyance passage and ejected outside the image forming apparatus 100 by a sheet ejection roller pair. In this manner, the sheets P bearing output images are ejected by the sheet ejecting roller pair one at a time onto a stacker outside the housing 100A of the image forming apparatus 100. Thus, the sheets P bearing an output image lie stacked on the stacker. After these processes, a series of image formation (printing) of the image forming apparatus 100 is completed.

In the present embodiment, the fixing device 20 is a detachable unit that is detachably attachable to the housing 100A of the image forming apparatus 100. A detailed description of the fixing device 20 is given below.

Next, a configuration and operation of the developing device 5Y of the process cartridge 6Y are described below in further detail, with reference to FIG. 2.

The developing device 5Y includes a developing roller 51Y, a doctor blade 52Y, two toner conveyance screws 55Y, and a toner concentration detection sensor 56Y. The developing roller 51Y is disposed opposite (facing) the photoconductor drum 1Y. The doctor blade 52Y is disposed opposite (facing) the developing roller 51Y. Each of the two toner conveyance screws 55Y is disposed in a developer container of the developing device 5Y. The toner concentration detection sensor 56Y detects a toner concentration in developer G. The developing roller 51Y includes a magnet and a sleeve. The magnet is fixed inside the developing roller 51Y. The sleeve rotates about the magnet. The developer container contains the developer G, which is a two-component developer including carrier (or carrier particles) and toner (or toner particles).

The developing device 5Y thus configured operates as follows.

The sleeve of the developing roller 51Y rotates in the direction indicated by arrow in FIG. 2. The magnet generates a magnetic field, which moves the developer G borne on the developing roller 51Y along with rotation of the sleeve on the developing roller 51Y. The developer G in the developing device 5 is adjusted so that the percentage of toner (i.e., the toner density) in the developer G falls within a given range. Specifically, when the toner concentration detection sensor 56Y disposed in the developing device 5Y detects low toner density, fresh toner (new toner) is supplied from the toner container 58 into the developing device 5Y so that the toner density falls within the given range.

The toner supplied into the developer container from the toner container 58 is circulated in two isolated chambers of the developer container while being stirred and mixed with the developer G by the two toner conveyance screws 55Y disposed in the respective chambers. By so doing, the toner moves in a direction perpendicular to the surface of the paper on which FIG. 2 is drawn. The toner in the developer G is electrically charged by friction with the carrier and thus is attracted to the carrier. Both the toner and the carrier are borne on the developing roller 51Y due to a magnetic force generated on the developing roller 51Y.

The developer G borne on the developing roller 51Y is conveyed in the direction indicated by arrow in FIG. 2 and reaches a position opposite (facing) the doctor blade 52Y. At this position, the doctor blade 52Y adjusts the amount of the developer G on the developing roller 51 to an appropriate amount. Thereafter, the developer G on the developing roller 51Y is conveyed to a position opposite the photoconductor drum 1Y (i.e., a development area). In the development area, the toner is attracted to the latent image formed on the photoconductor drum 1Y by an electric field generated in the developing area. Thereafter, the developer G remaining on the developing roller 51Y is conveyed to an upper portion of the developer container along with rotation of the sleeve of the developing roller 51Y, where the developer G is separated from the developing roller 51Y. The electric field formed in the development area is formed by a potential difference between a developing bias applied to the developing roller 51Y by a power source and an exposure potential on the photoconductor drum 1Y.

Note that the toner container 58 is removably (or replaceably) mounted in the process cartridge 6Y. In other words, the toner container 58 is removably (or replaceably) mounted in the image forming apparatus 100. Specifically, when the fresh toner contained in the toner container 58 is consumed and the toner container 58 becomes empty, the toner container 58 is removed from the developing device 5Y (in other words, the toner container 58 is removed from the image forming apparatus 100) and replaced with a new toner container 58.

Hereinafter, a description is given of the fixing device 20 as a detachable unit according to the present embodiment, with reference to FIG. 3.

Figure 3:
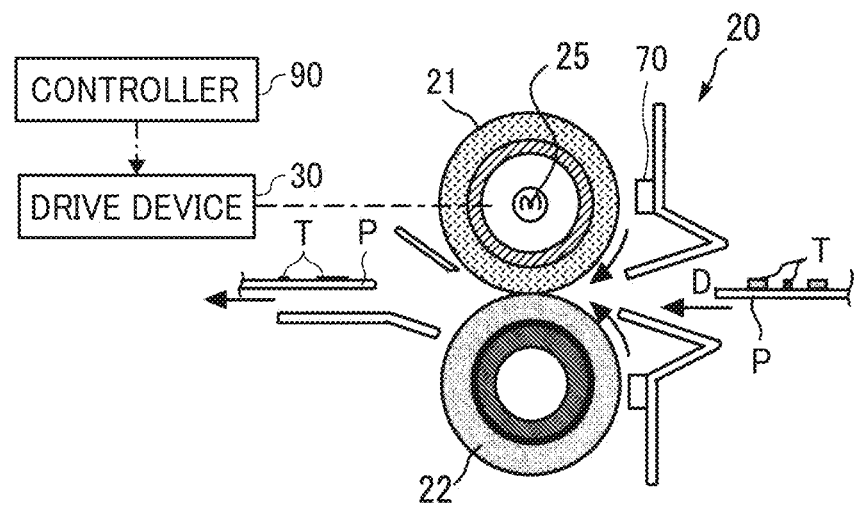
FIG. 3 is a diagram illustrating a configuration of a fixing device of the image forming apparatus of FIG. 1.

FIG. 3 is a diagram illustrating a configuration of the fixing device 20 of the image forming apparatus 100 of FIG. 1.

The fixing device 20 functions as a detachable unit that is detachably attachable to the housing 100A of the image forming apparatus 100. Specifically, an operator such as a user or a service person opens a cover of the housing 100A of the image forming apparatus 100 to expose the fixing device 20 while the image forming apparatus 100 stops the operation, and then pulls out the fixing device 20 to the front side (near side) of the image forming apparatus 100 in an attaching-detaching direction (i.e., a direction perpendicular to the surface of a paper of FIG. 1 and a left-right direction of FIG. 4) to perform maintenance or replacement of the fixing device 20 or paper jam handling of the image forming apparatus 100.

As illustrated in FIG. 3, the fixing device 20 includes a fixing roller 21, a heater 25, and a pressure roller 22. The fixing roller 21 functions as a fixing rotator. The heater 25 functions as a rod-shaped heating device. The pressure roller 22 functions as a pressure rotator.

The fixing roller 21 serving as a fixing rotator is a multi-layer roller having a core, an elastic layer coated on the core, and a release layer coated on the elastic layer. The fixing roller 21 is pressed against the pressure roller 22 serving as a pressure rotator to form a fixing nip region. A controller 90 causes the drive device 30 to drive and rotate the fixing roller 21 clockwise in FIG. 2. A detailed description of the configuration and operations of the drive device 30 is described below.

The rod-shaped heater 25 is fixed inside the fixing roller 21 having a hollow structure. The controller 90 causes the heater 25 under output control to heat the fixing roller 21 with radiation heat from the heater 25, and then the fixing roller 21 further heated by the heater 25 applies heat from the surface of the fixing roller 21 to a toner image T on a sheet P. The controller 90 controls the output of the heater 25 based on the detection result of a surface temperature of the fixing roller 21 (specifically, a temperature of the outer circumferential surface of the fixing roller 21) detected by a temperature sensor 70. The temperature sensor 70 is disposed opposite (facing) the outer circumferential surface of the fixing roller 21 without contacting the outer circumferential surface of the fixing roller 21. The pressure roller 22 serving as a pressure rotator is a roller having a core and an elastic layer coated on the core. The pressure roller 22 is rotated counterclockwise in FIG. 3 together with rotation of the fixing roller 21.

In response to a print command or print request, the drive device 30 starts rotating the fixing roller 21 clockwise in FIG. 3. Meanwhile, the pressure roller 22 starts rotating counterclockwise in FIG. 3 in accordance with the clockwise rotation of the fixing roller 21. Then, at the secondary transfer nip region between the intermediate transfer belt 8 and the secondary transfer roller 40, a toner image is transferred from the intermediate transfer belt 8 onto a sheet P fed from the sheet feeding device 41. Thus, the sheet P bears the toner image as an unfixed toner image. As illustrated in FIG. 3, the sheet P bearing the unfixed toner image T (i.e., toner image containing the toner T) is conveyed in a direction D (hereinafter referred to as a sheet conveyance direction D) and enters the fixing nip region between the fixing roller 21 and the pressure roller 22 pressed against the fixing roller 21. At the fixing nip region, the toner image containing the toner T is fixed onto a surface of the sheet P by application of heat from the fixing roller 21 and pressure exerted from the fixing roller 21 and the pressure roller 22. Thus, the sheet P bears the toner image as a fixed toner image. Then, the sheet P bearing the fixed toner image is sent out of the fixing nip region in the sheet conveyance direction D by the fixing roller 21 and the pressure roller 22 as the fixing roller 21 and the pressure roller 22 rotate.

Now, a detailed description is given of the drive device 30 of the image forming apparatus 100 according to the present embodiment.

Figure 4A:
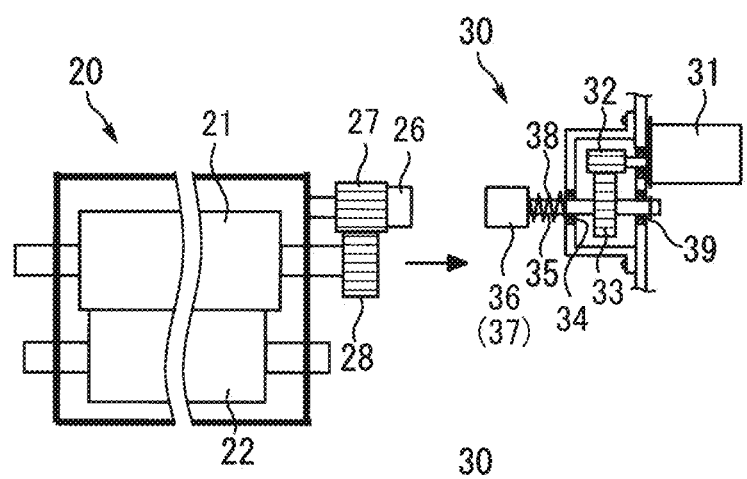
FIG. 4A is a diagram illustrating a state immediately before the fixing device is attached to a drive device.
Figure 4B:
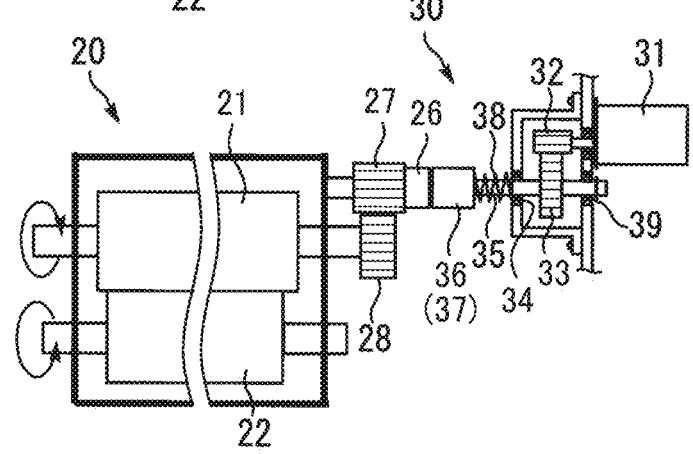
FIG. 4B is a diagram illustrating a state after the fixing device is attached to the drive device.

With reference to FIGS. 4A and 4B, the drive device 30 drives the fixing device 20 (fixing unit) serving as a detachable unit that is detachably attached to the housing 100A of the image forming apparatus 100.

FIG. 4A is a diagram illustrating a state immediately before the fixing device 20 is attached to the drive device 30.

FIG. 4B is a diagram illustrating a state after the fixing device 20 is attached to the drive device 30.

Figure 5A:
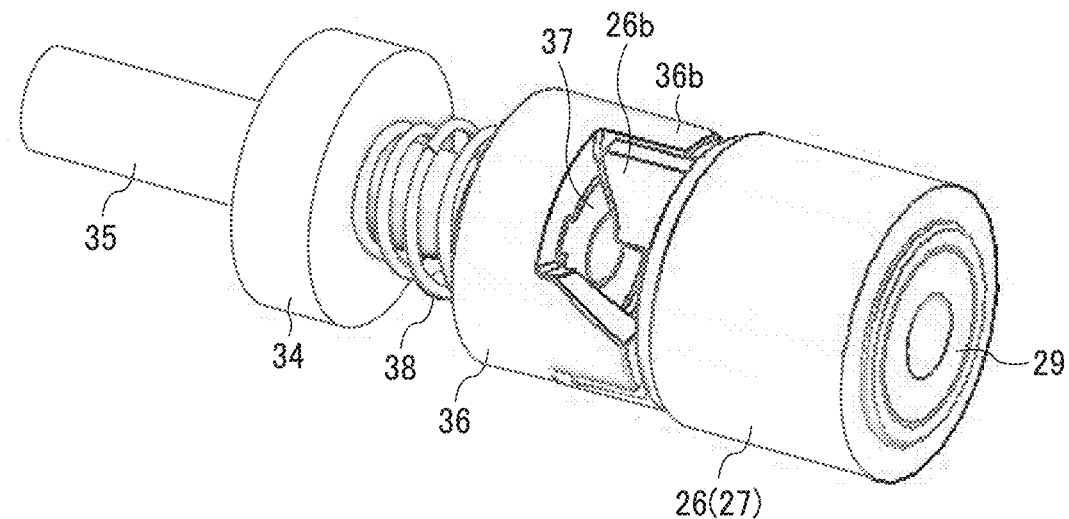
FIG. 5A is a diagram illustrating a state in which a drive coupling and a driven coupling are normally fitted to each other.

FIG. 5A is a diagram illustrating a state in which a drive coupling and a driven coupling are normally fitted to each other.

Figure 5B:
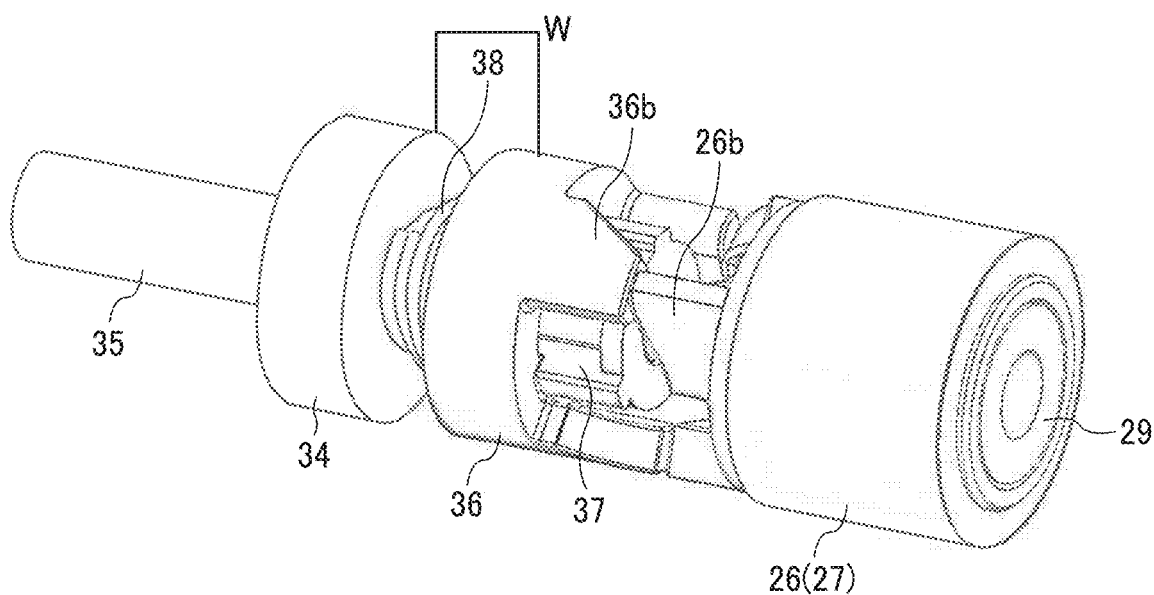
FIG. 5B is a diagram illustrating a state in which the drive coupling and the driven coupling are not normally fitted to each other.

FIG. 5B is a diagram illustrating a state in which the drive coupling and the driven coupling are not normally fitted to each other.

As illustrated in FIGS. 4A and 4B, the drive device 30 includes a drive motor 31, a drive gear 32, a gear 33, a rotary shaft 35, a drive coupling 36, a relay member 37, a compression spring 38, and bearings 34 and 39.

The drive motor 31 is fixedly mounted on a side panel of the housing 100A of the image forming apparatus 100. The drive gear 32 is mounted on the motor shaft of the drive motor 31 and meshed with the gear 33 of the rotary shaft 35.

The rotary shaft 35 is rotatably supported with respect to the side panel (bracket) of the housing 100A of the image forming apparatus 100 via the bearings 34 and 39. The gear 33, the drive coupling 36, and the relay member 37 are mounted on the rotary shaft 35 to rotate together with the rotary shaft 35. As the drive motor 31 is driven, the rotation force (driving force) of the drive motor 31 is transmitted from the drive gear 32 to the gear 33, so that the rotary shaft 35 rotates in a predetermined direction together with the drive coupling 36 and the relay member 37.

A detailed description is given below of the configuration and operations of the drive coupling 36 and the configuration and operations of the relay member 37, with reference to FIGS. 6A to 9C.

Figure 6A:
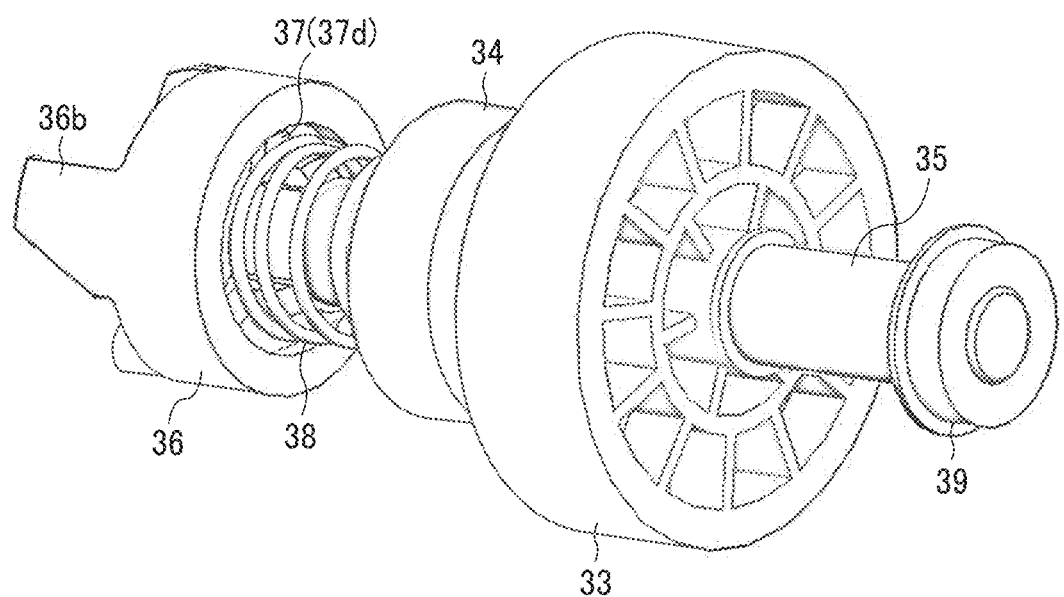
FIG. 6A is a diagram illustrating a main part of the drive device.

FIG. 6A is a diagram illustrating a main part of the drive device 30.

Figure 6B:
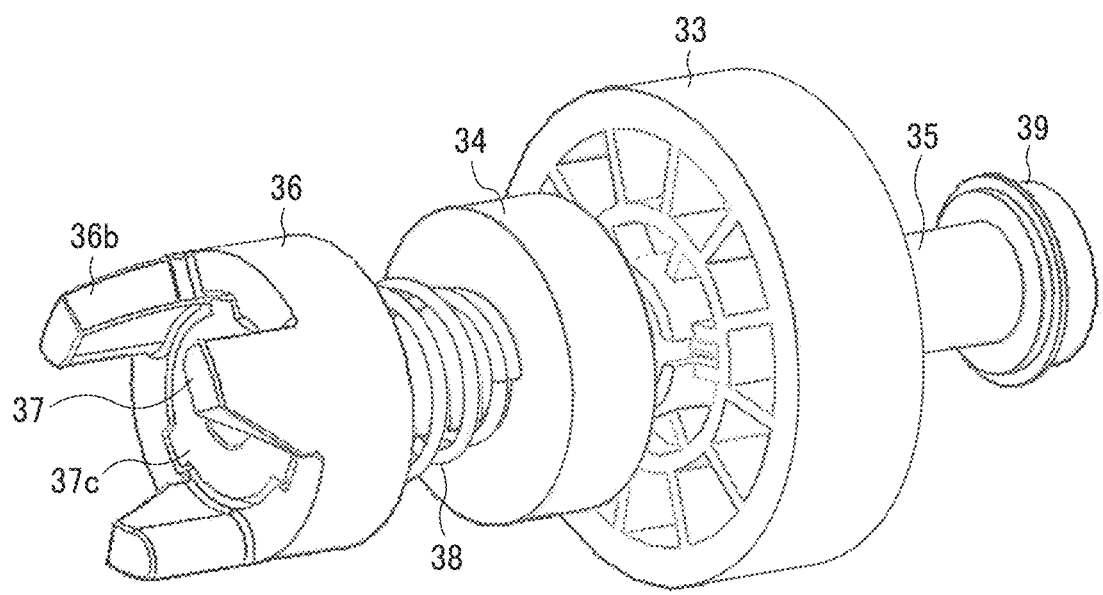
FIG. 6B is a diagram illustrating the main part of the drive device, viewed in another direction.

FIG. 6B is a diagram illustrating the main part of the drive device 30, viewed in another direction.

Figure 7A:
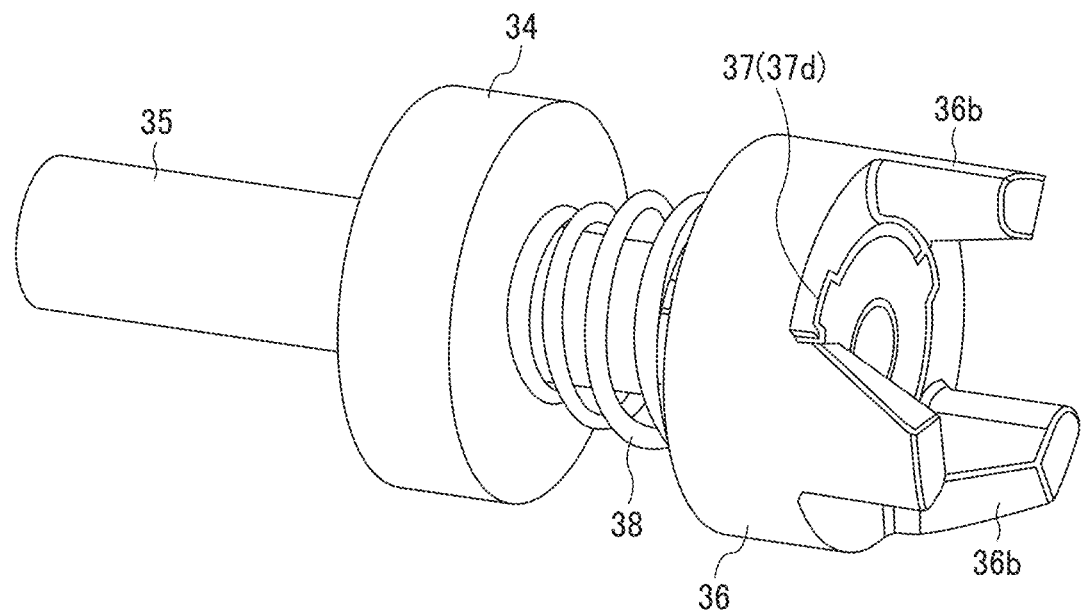
FIG. 7A is a diagram illustrating the main part of the drive device of FIGS. 6A and 6B, without a gear.

FIG. 7A is a diagram illustrating the main part of the drive device 30 of FIGS. 6A and 6B, without a gear.

Figure 7B:
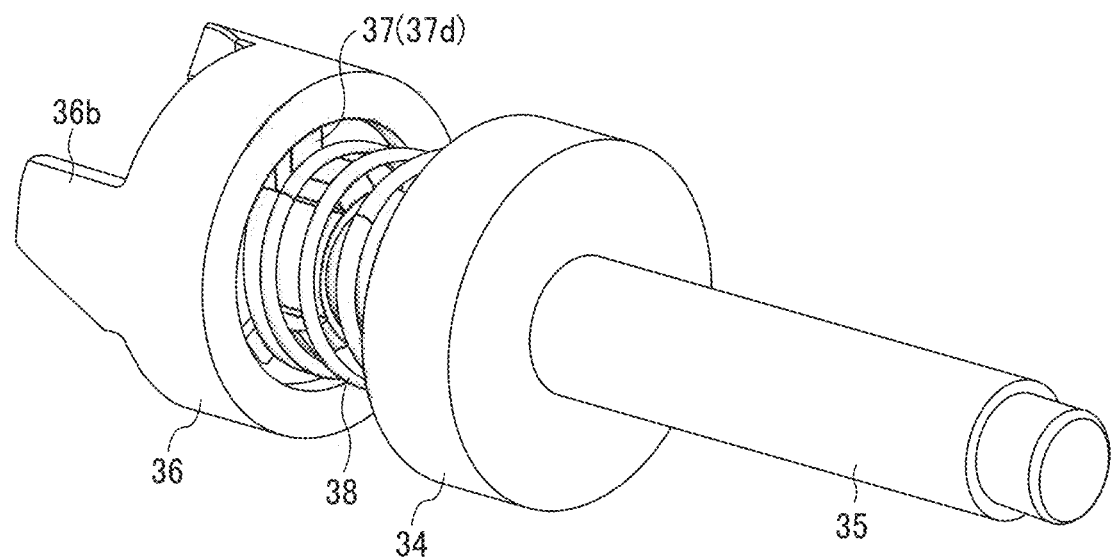
FIG. 7B is a diagram illustrating the main part of the drive device of FIGS. 6A and 6B, without a gear, viewed from another angle.

FIG. 7B is a diagram illustrating the main part of the drive device 30 of FIGS. 6A and 6B, without a gear, viewed from another angle.

Figure 8A:
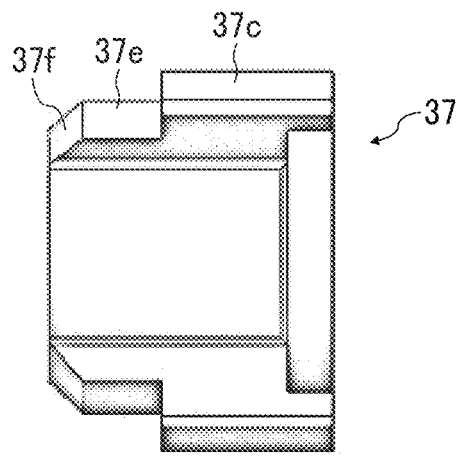
FIGS. 8A, 8B, and 8C are diagrams illustrating a configuration of a relay member, viewed from different directions.
Figure 8B:
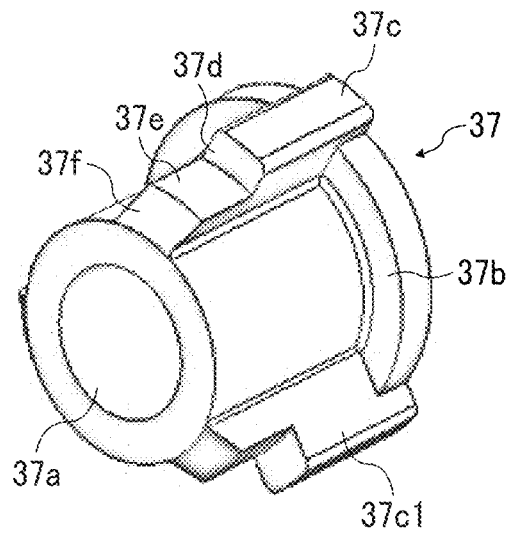
Figure 8C:
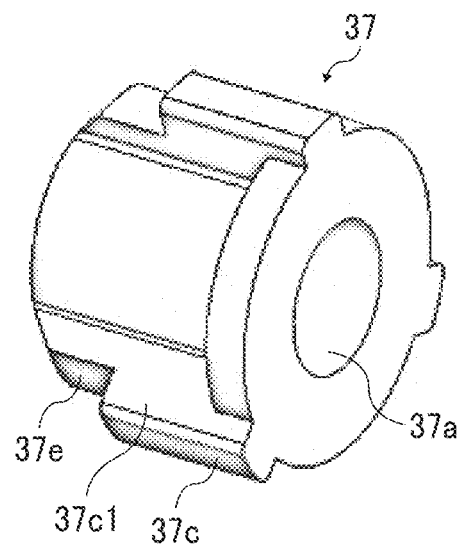

FIGS. 8A, 8B, and 8C are diagrams illustrating a configuration of the relay member 37, viewed from different directions.

Figure 9A:
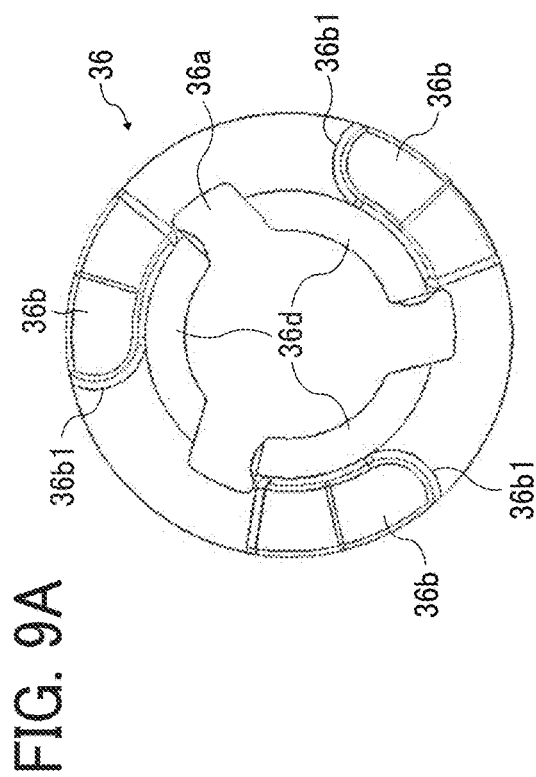
FIGS. 9A, 9B, and 9C are diagrams illustrating a configuration of the drive coupling, viewed from different directions.
Figure 9C:
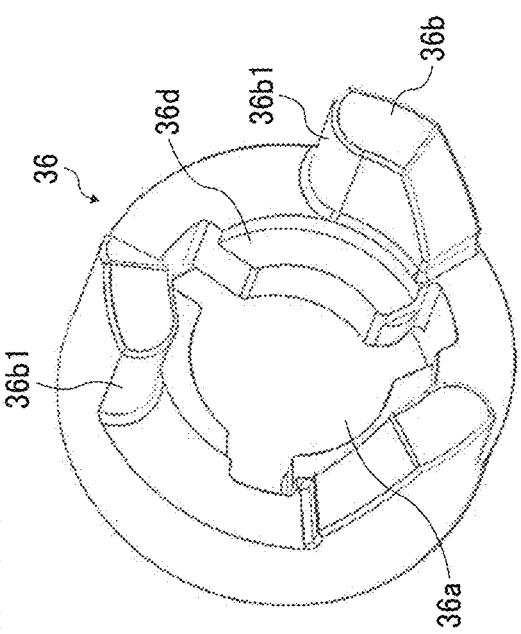
Figure 9B:
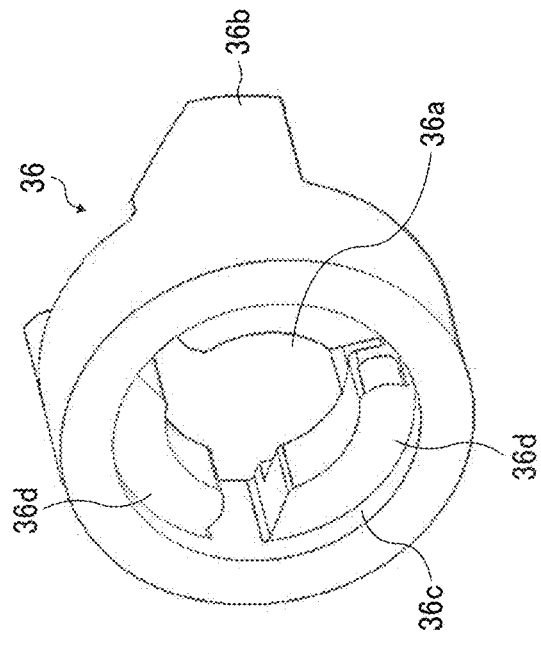

FIGS. 9A, 9B, and 9C are diagrams illustrating a configuration of the drive coupling 36, viewed from different directions.

With reference to FIGS. 4A and 4B, the fixing device 20 serving as a detachable unit is detachably attached to the housing 100A of the image forming apparatus 100.

Specifically, at the time of, e.g., maintenance and paper jam handling, the fixing device 20 is pulled out (detached) from the housing 100A of the image forming apparatus 100 along a slide rail in a direction opposite to the direction indicated by arrow in FIG. 4A. In other words, the fixing device 20 moves from the state illustrated in FIG. 4B to the state illustrated in FIG. 4A. When the fixing device 20 is detached from the housing 100A of the image forming apparatus 100, the driven coupling 26 of the fixing device 20 is disengaged from the drive coupling 36 of the housing 100A of the image forming apparatus 100.

Then, after the operation performed by the operator has been completed, the fixing device 20 is pushed (attached) into the housing 100A of the image forming apparatus 100 along the slide rail in the direction indicated by arrow in FIG. 4A. In other words, the fixing device 20 moves from the state illustrated in FIG. 4A to the state illustrated in FIG. 4B. By so doing, a positioning pin provided with the housing 100A of the fixing device 20 image forming apparatus 100 fits to a positioning opening that is formed in a panel of the housing 100A of the image forming apparatus 100. As a result, the position of the fixing device 20 with respect to the housing 100A of the image forming apparatus 100 is fixed. Further, as illustrated in FIGS. 4B and 5A, the driven coupling 26 provided for the fixing device 20 is fitted to the drive coupling 36 of the drive device 30 included in the housing 100A of the image forming apparatus 100, so that the fixing device 20 is driven by (the drive motor 31 of) the drive device 30.

Figure 10:
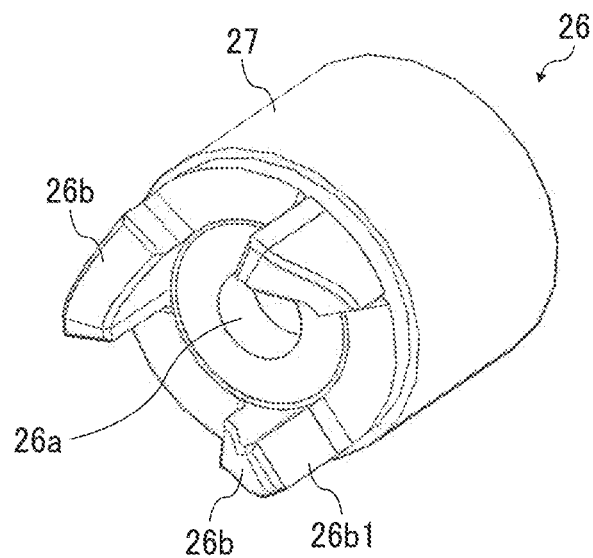
FIG. 10 is a diagram illustrating a configuration of the driven coupling.

Note that a stud is fixedly disposed in the housing 100A of the fixing device 20 (detachable unit) and a gear 27 is formed on the driven coupling 26 (see FIG. 10). The driven coupling 26 is rotatably fixed to the stud of the fixing device 20 via a bearing 29 (see FIGS. 5A and 5B). The gear 27 of the driven coupling 26 is meshed with a gear 28 mounted on the fixing roller 21. Due to such a configuration, the fixing device 20 may be driven by the drive device 30. In other words, the fixing roller 21 and the pressure roller 22 may be rotated by the drive device 30.

Now, a detailed description is given of the drive device 30.

As described above with reference to FIGS. 4A and 4B, the drive coupling 36 is brought into contact with or separated from (fitted to or released from) the driven coupling 3626 of the fixing device 20 along with attachment and detachment of the fixing device 20 (detachable unit) with respect to the housing 100A of the image forming apparatus 100. In the present embodiment, the driven coupling 26 has three claws 36b and the driven coupling 26 includes three claws 26b. When the drive coupling 36 is normally fitted to the driven coupling 26, as illustrated in FIG. 5A, the three claws 36b of the drive coupling 36 are fitted to the three claws 26b of the driven coupling 26, respectively. The rotation forces (driving forces) are transmitted from the three claws 36b of the drive coupling 36 to the three claws 26b of the driven coupling 26.

As illustrated in FIGS. 5A to 7B, the relay member 37 is fixedly mounted on the rotary shaft 35 to be inserted into an opening 36a of the drive coupling 36. The opening 36a is a through hole formed around the central axis of the drive coupling 36 including the central axis.

The relay member 37 transmits the rotation force of the rotary shaft 35 to the drive coupling 36, so that the drive coupling 36 rotates together with the rotary shaft 35. Specifically, the relay member 37 is a member to receive the rotation force of the rotary shaft 35 and relay the transmission of the rotation force to the drive coupling 36. Further, the drive coupling 36 is held to be axially movable with respect to the relay member 37 that is fixed not to axially move on the rotary shaft 35. As illustrated in FIGS. 5A to 7B, the relay member 37 has three projections 37c (see FIGS. 8A to 8C) and the drive coupling 36 has three recesses formed by three small-diameter portions 36d (see FIGS. 9A to 9C, 13A, and 13B). The three projections 37c of the relay member 37 fit to the three recesses (three small-diameter portions 36d) of the drive coupling 36, respectively. Due to this configuration, the rotation force (driving force) is transmitted from the three projections 37c of the relay member 37 to the three recesses (small-diameter portions 36d) of the drive coupling 36, respectively.

Referring to FIGS. 5A to 7B and 11, the compression spring 38 is wound around the rotary shaft 35. One axial end (right side in FIG. 11) of the compression spring 38 is in contact with the bearing 34 that functions as a contact member disposed at a position farther from the driven coupling 26 than the relay member 37, and the opposite axial end (left side in FIG. 11) of the compression spring 38 is in contact with the relay member 37. Specifically, the compression spring 38 is wound around the rotary shaft 35 without a gap between the bearing 34 and the driven coupling 26. At this time, the biasing force (spring force) of the compression spring 38 is not applied to the drive coupling 36.

When the drive coupling 36 is normally fitted to the driven coupling 26 as illustrated in FIG. 5A or when the fixing device 20 is separated from the drive device 30 (the housing 100A of the image forming apparatus 100) as illustrated in FIG. 4A, the compression spring 38 is disposed between the bearing 34 and a contact portion 37d of the relay member 37 (see FIGS. 6Aa and 8B). In addition, when the drive coupling 36 is not normally fitted to the driven coupling 26 as illustrated in FIG. 5B, the compression spring 38 is disposed between the bearing 34 and the small-diameter portions 36d (see FIGS. 9A to 9C) to bias the drive coupling 36 toward the driven coupling 26.

Specifically, the drive coupling 36 is biased by the compression spring 38 to the opposite axial end (left side in FIG. 11 and toward the driven coupling 26) when the drive coupling 36 moves toward the one axial end (right side in FIG. 11) to the relay member 37.

Specifically, the drive coupling 36 is biased by the compression spring 38 to the opposite axial end (left side in FIG. 11 and toward the driven coupling 26) when the drive coupling 36 moves toward the one axial end (right side in FIG. 11) to the relay member 37 beyond a given distance W.

Specifically, as described above with reference to FIG. 5B, when the drive coupling 36 is pushed by the driven coupling 26 due to a fitting failure and moves toward the one axial end, the compression spring 38 does not contact the drive coupling 36 (small-diameter portions 36d) until the distance of movement of the drive coupling 36 reaches the given distance W. After the distance of movement of the drive coupling 36 has reached the given distance W, the compression spring 38 comes into contact with the drive coupling 36 (small-diameter portions 36d), so that the biasing force is applied to the drive coupling 36. The "given distance W" is set sufficiently shorter than the distance of movement of the drive coupling 36 pressed by the driven coupling 26.

As illustrated in FIG. 5B, the drive coupling 36 moves toward one axial end (toward the right side in FIG. 11) due to the relation of postures in the rotational direction between the three claws 26b of the driven coupling 26 of the fixing device 20 and the three claws 36b of the drive coupling 36 when the fixing device 20 is attached to the housing 100A of the image forming apparatus 100 as illustrated in FIG. 4A. To be more specific, as illustrated in FIG. 5B, when the tips of the claws 26b and the tips of the claws 36b come into contact with each other due to the posture of the claws 26b and the posture of the claws 36b in the rotational direction, the drive coupling 36 is pushed in the axial direction by the driven coupling 26 against the biasing force of the compression spring 38, sliding on the rotary shaft 35. Then, as the drive motor 31 of the drive device 30 start rotating the drive coupling 36, the drive coupling 36 changes the posture in the rotational direction so as to be fitted to the driven coupling 26 (posture in FIG. 5A), so that the drive coupling 36 moves in the axial direction by the biasing force of the compression spring 38 to fit to the driven coupling 26. At this time, the side faces of the claws 26b and the side faces of the claws 36b are brought into contact with each other.

Now, a detailed description is given of the configuration and operations of the relay member 37.

As illustrated in FIGS. 8A to 8C, the relay member 37 is a substantially cylindrical member having an opening 37a, stoppers 37b, and projections 37c.

Figure 11:
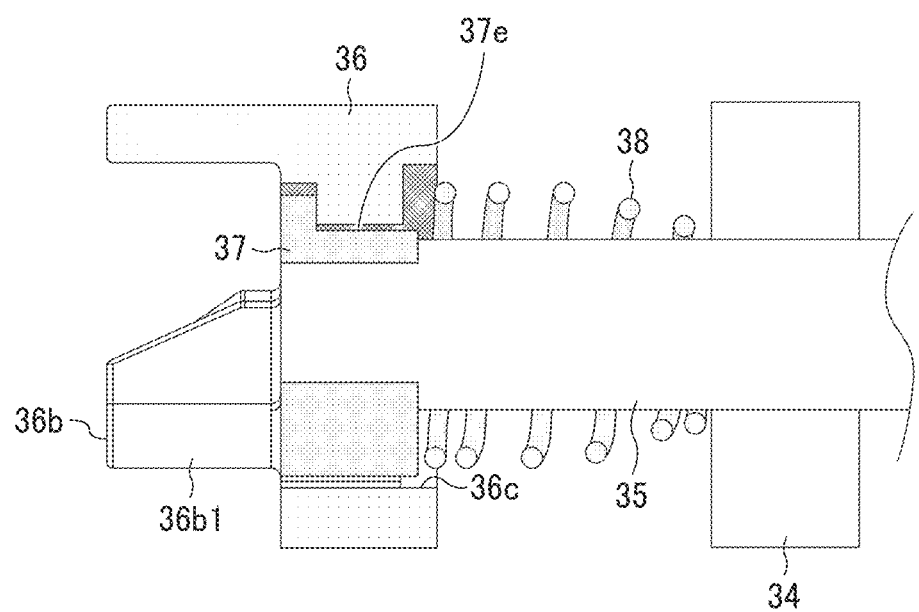
FIG. 11 is a cross-sectional view of the main part of the drive device according to an embodiment of the present disclosure.

The stopper 37b restricts movement of the drive coupling 36 toward the opposite axial end (left side in FIG. 11). Each of the stoppers 37b contacts the opposite axial end of the small-diameter portions 36d of the drive coupling 36 (see FIGS. 9A to 9C). Each of the stoppers 37b prevents a failure of the drive coupling 36 coming off from the rotary shaft 35.

The projections 37c are divided into three projections in the circumferential direction about the rotary shaft at equal intervals to radially protrude.

The side faces of the projections 37c (i.e., side face on the upstream side in the rotational direction) are respective portions each functioning as a first drive transmitting portion 37c1 that is in contact with the drive coupling 36 and transmits the rotation force of the rotary shaft 35 to the drive coupling 36.

In the present embodiment, the first drive transmitting portion 37c1 is a portion where the relay member 37 and the drive coupling 36 make line contact with each other. Specifically, the projections 37c of the relay member 37 and the small-diameter portions 36d of the drive coupling 36 are to make line contact with each other instead of making surface contact with each other. To be more specific, in the present embodiment, the side faces (drive transmission object portion) of the small-diameter portions 36d of the drive coupling 36 has a curved face, and the first drive transmitting portion 37c1 of the relay member 37 has a flat face. As a result, the frictional resistance caused by contact of the projections 37c of the relay member 37 and the side faces of the small-diameter portions 36d of the drive coupling 36 is reduced, and the rotation force (driving force) is efficiently transmitted from the relay member 37 to the drive coupling 36.

The opposite axial end of each of the projections 37c is formed in steps. The small-diameter portion of each of the projections 37c functions as the inner circumference side restrictor 37e that is a portion facing the inner diameter portion of the compression spring 38. The step portion of each of the projections 37c functions as a contact portion 37d that is a wall with a changeable diameter.

The inner circumference side restrictor 37e of the relay member 37 is disposed facing the inner circumference of the compression spring 38 to restrict movement of the compression spring 38 in the radial direction. Specifically, even if the compression spring 38 tends to move (shift in position) in the radial direction by the gap with the rotary shaft 35, the inner circumference of the compression spring 38 contacts the inner circumference side restrictor 37e to restrict the movement of the compression spring 38 in the radial direction. In other words, the inner circumference side restrictor 37e functions as a member that guides the compression spring 38 to maintain the posture of the compression spring 38 with respect to the rotary shaft 35. Due to such a configuration, as described above with reference to FIGS. 5A and 5B, even if the compression spring 38 expands and contracts (between a position at which the compression spring 38 does not contact the drive coupling 36 and a position at which the compression spring 38 contacts the drive coupling 36 that moves in the axial direction), the compression spring 38 is less likely to be displaced from the correct position or inclined in the radial direction.

The contact portion 37d is a portion to which the end face of opposite axial end of the compression spring 38 comes into contact in the normal operation, as illustrated in FIGS. 6A and 7B. As described above, when the drive coupling 36 and the driven coupling 26 are normally fitted to each other and the fixing device 20 is driven by the drive device 30, the compression spring 38 contacts the contact portion 37d of the relay member 37, and the biasing force of the compression spring 38 does not act on the drive coupling 36. Specifically, in the present embodiment, when the drive coupling 36 is fitted to the driven coupling 26 and the driving force is transmitted from the drive coupling 36 to the driven coupling 26, the compression spring 38 contacts the contact portion 37d of the relay member 37 without contacting the drive coupling 36.

As a result, even if an axial misalignment or a deviation angle occurs between the drive coupling 36 and the driven coupling 26, a failure in which a large axial reaction force is applied to the drive coupling 36 and the driven coupling 26 is less likely to occur.

Further, in the present embodiment, the contact portion 37d of the relay member 37 is formed by being divided into three or more portions (three portions in the present embodiment) in the circumferential direction around the rotary shaft. In this way, by providing three or more contact portions 37d in the circumferential direction, the end face of the compression spring 38 is supported in a well-balanced manner, and a failure in which the compression spring 38 contacts with the drive coupling 36 in the normal operation is prevented.

Referring to FIGS. 8A, 8B, and 8C, a tapered portion 37f is formed in the opposite axial end of the inner circumference side restrictor 37e, where the diameter of the tapered portion 37f gradually decreases toward the opposite axial end of the inner circumference side restrictor 37e. As described above with reference to FIGS. 5A and 5B, the tapered portion 37f allows the compression spring 38 to smoothly expand and contract (expansion and contraction between the position where the compression spring 38 does not contact the drive coupling 36 and the position where the compression spring 38 contacts the drive coupling 36 moving in the axial direction) without being caught by the inner circumference side restrictor 37e. In other words, the tapered portion 37f functions as a guide face that guides expansion and contraction of the compression spring 38.

In the present embodiment, the relay member 37 is formed of a metallic material, which is similar to the rotary shaft 35. In the manufacturing process of the drive device 30, the relay member 37 is assembled from the opposite axial end (left side in FIG. 11) with respect to the rotary shaft 35 and is fixed to the rotary shaft 35 by, e.g., press-fitting.

Next, a detailed description is given of the configuration of the drive coupling 36.

As illustrated in FIGS. 9A, 9B, and 9C, the drive coupling 36 is a substantially cylindrical member made of a resinous material. An opening 36a is provided inside the drive coupling 36 and three claws 36b are provided at the tips on one axial end of the drive coupling 36. Inside the drive coupling 36, three small-diameter portions 36d are formed at equal intervals with respective gaps (recesses) with adjacent small-diameter portions 36d. Then, as described above, the projections 37c of the relay member 37 are fitted into the three gaps (recesses) formed by the three small-diameter portions 36d of the drive coupling 36, so that the driving force is transmitted from the relay member 37 to the drive coupling 36. Specifically, the side face of the projections 37c (i.e., the first drive transmitting portion 37c1) contacts the side face of the small-diameter portions 36d (that is the side face on the upstream side in the rotational direction) to transmit the rotation force of the rotary shaft 35 to the drive coupling 36.

As described above, the surfaces of on one axial end of the small-diameter portions 36d are formed so as to contact the stopper 37b of the relay member 37. Further, the surfaces of the opposite axial end of the small-diameter portions 36d side are portions with which the end face of the one axial end of the compression spring 38 comes into contact when a fitting failure occurs between the drive coupling 36 and the driven coupling 26.

The three claws 36b of the drive coupling 36 are formed with gaps at equal intervals. The side faces of the claws 36b (i.e., side face on the upstream side in the rotational direction) of the drive coupling 36 are respective portions each functioning as a second drive transmitting portion 36b1 that transmits the rotation force of the drive coupling 36 to the driven coupling 26 by contacting the side faces of the claws 26b of the driven coupling 26 (see FIG. 10). Each of the side faces of the claws 26b of the driven coupling 26 functions as a drive transmission object portion 26b1.

In the present embodiment, the second drive transmitting portion 36b1 is a portion where the drive coupling 36 and the driven coupling 26 make line contact with each other. Specifically, the claw 36b of the drive coupling 36 and the claw 26b of the driven coupling 26 are to make line contact with each other instead of making surface contact with each other. To be more specific, in the present embodiment, the second drive transmitting portion 36b1 of the claw 36b of the drive coupling 36 has a curved face, and the drive transmission object portion 26b1 of the claw 26b of the driven coupling 26 has a flat face. As a result, the frictional resistance caused by contact of the claw 26b of the driven coupling 26 and the claw 36b of the drive coupling 36 is reduced, and the rotation force (driving force) is efficiently transmitted from the drive coupling 36 to the driven coupling 26.

As illustrated in FIGS. 9A, 9B, and 9C, each of the small-diameter portions 36d of the drive coupling 36 has a stepped portion at a position away from the end face on the opposite axial end toward the one axial end. The stepped portion functions as an outer circumference side restrictor 36c.

The outer circumference side restrictor 36c of the drive coupling 36 is disposed facing the outer circumference of the compression spring 38 to restrict movement of the compression spring 38 in the radial direction. Specifically, even if the compression spring 38 tends to move (shift in position) in the radial direction by the gap with the rotary shaft 35, the outer circumference of the compression spring 38 contacts the outer circumference side restrictor 36c to restrict the movement of the compression spring 38 in the radial direction. In other words, the outer circumference side restrictor 36c functions as a member that guides the compression spring 38 to maintain the posture of the compression spring 38 with respect to the rotary shaft 35. Due to such a configuration, as described above with reference to FIGS. 5A and 5B, even if the compression spring 38 expands and contracts (between a position at which the compression spring 38 does not contact the drive coupling 36 and a position at which the compression spring 38 contacts the drive coupling 36 that moves in the axial direction), the compression spring 38 is less likely to be displaced from the correct position or inclined in the radial direction.

Note that the outer circumference side restrictor 36c of the drive coupling 36 is formed in a circular shape (ring shape) that covers the opposite axial end of the compression spring 38 in the opening 36a of the drive coupling 36.

FIG. 10 is a diagram illustrating a configuration of the driven coupling 26.

FIG. 11 is a cross-sectional view of the main part of the drive device 30 according to an embodiment of the present disclosure.

Figure 12A:
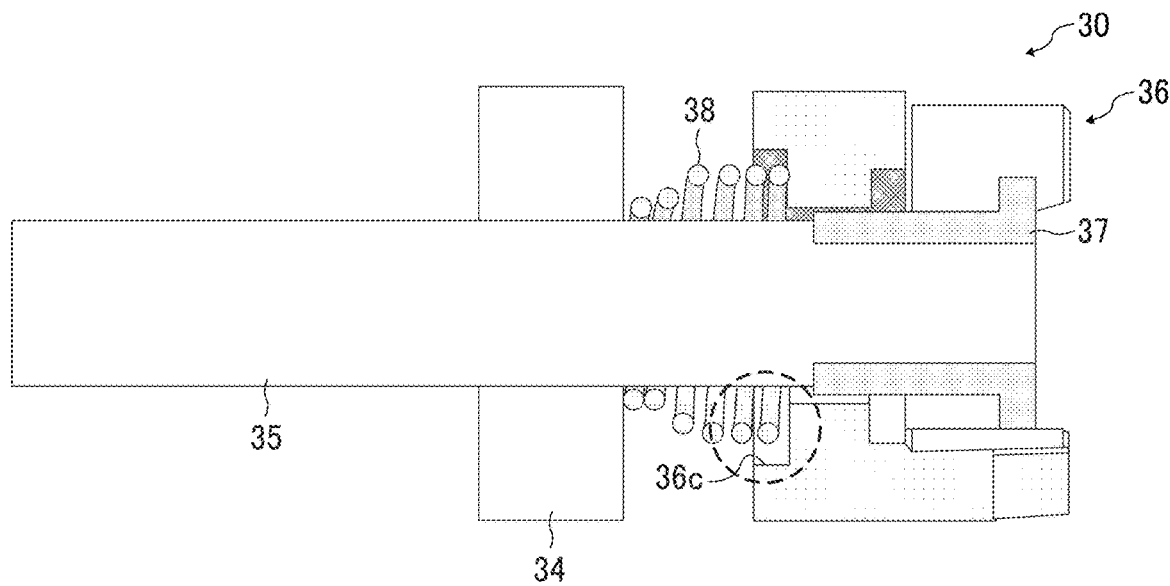
FIG. 12A is a diagram illustrating the main part of the drive device according to an embodiment of the present disclosure.

FIG. 12A is a diagram illustrating the main part of the drive device 30 according to an embodiment of the present disclosure.

Figure 12B:
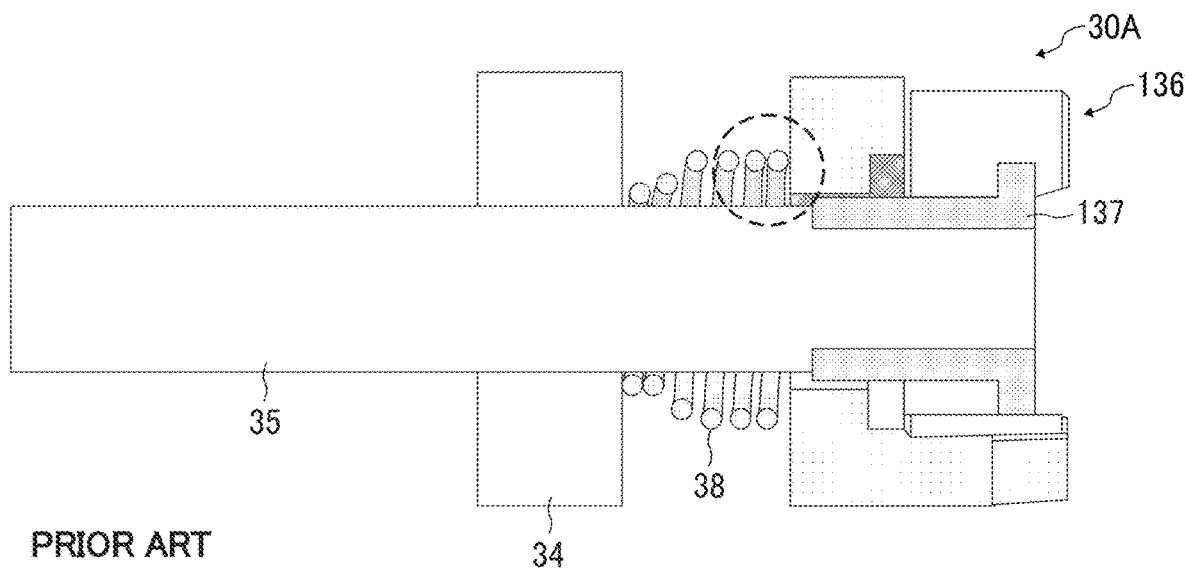
FIG. 12B is a diagram illustrating the main part of a drive device as a comparative example.

FIG. 12B is a diagram illustrating the main part of a drive device as a comparative example.

Referring to FIG. 10, three claws 26b are formed in the driven coupling 26 of the fixing device 20 (detachable unit) at an axial end of the gear 27. As described above, each of the side faces of the three claws 26b functions as the drive transmission object portion 26b1.

Note that the driven coupling 26 according to the present embodiment has a bearing integrally installed in the opening 26a of the driven coupling 26 as a single unit and is rotatably held by the stud provided on the housing 100A of the fixing device 20.

As described above, in the drive device 30 according to the present embodiment, the drive coupling 36 includes the outer circumference side restrictor 36c that is disposed facing the outer circumference of the compression spring 38 to restrict movement of the compression spring 38 in the radial direction, and the relay member 37 includes the inner circumference side restrictor 37e that is disposed facing the inner circumference of the compression spring 38 to restrict movement of the compression spring 38 in the radial direction.

Due to such a configuration, the drive device 30 does not increase in size and cost and is less likely to cause the fitting failure of the drive coupling 36 and the driven coupling 26.

Specifically, a drive device 30A illustrated in FIG. 12B is a comparative example and includes a drive coupling 136 and a relay member 137 each not including a restrictor that restricts movement of the compression spring 38 in the radial direction. In the drive device 30A including the drive coupling 136 and the relay member 137, when the fixing device 20 is attached to the housing 100A of the image forming apparatus 100 and the drive coupling 136 is pushed in the axial direction by a driven coupling, the compression spring 38 contacts the end face of the drive coupling 136 (see the portion encircled by a broken line). When the rotation driving of the drive coupling 136 is started in such a state, the drive coupling 136 may not move straight in the axial direction due to the positional deviation or inclination of the compression spring 38 in the radial direction. This incorrect action of the compression spring 38 may cause a failure in which the drive coupling 136 and the driven coupling do not fit properly with each other. Once such a failure occurs, the fixing device 20 is not normally driven by the drive device 30A.

On the other hand, with reference to FIG. 12A, in the present embodiment, even if the compression spring 38 expands and contracts, the posture of the compression spring 38 is correctly maintained by the outer circumference side restrictor 36c and the inner circumference side restrictor 37e. Due to such this configuration, such an inconvenience is unlikely to occur.

In the present embodiment, another member for holding the posture of the compression spring 38 is not separately provided, but each of the drive coupling 36 and the relay member 37 is formed to have a specific shape to hold the posture of the compression spring 38. As a result, the drive device 30 prevents spending space or cost spent for such a member to hold the compression spring 38 and prevents a failure that increases the size and cost of the drive device 30.

Figure 13A:
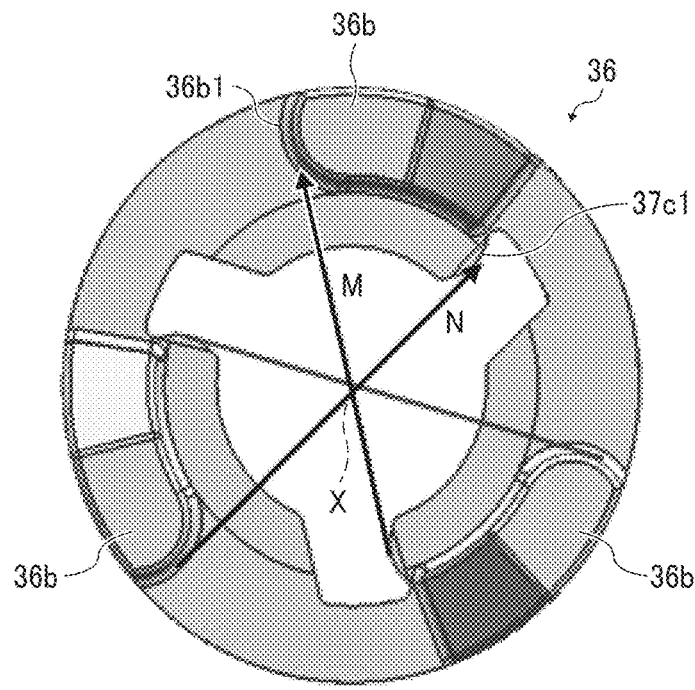
FIG. 13A is a diagram illustrating the drive device, indicating a distance from an axial center of first and second drive transmitting portions.

FIG. 13A is a diagram illustrating the drive device, indicating a distance from an axial center of first and second drive transmitting portions.

Figure 13B:
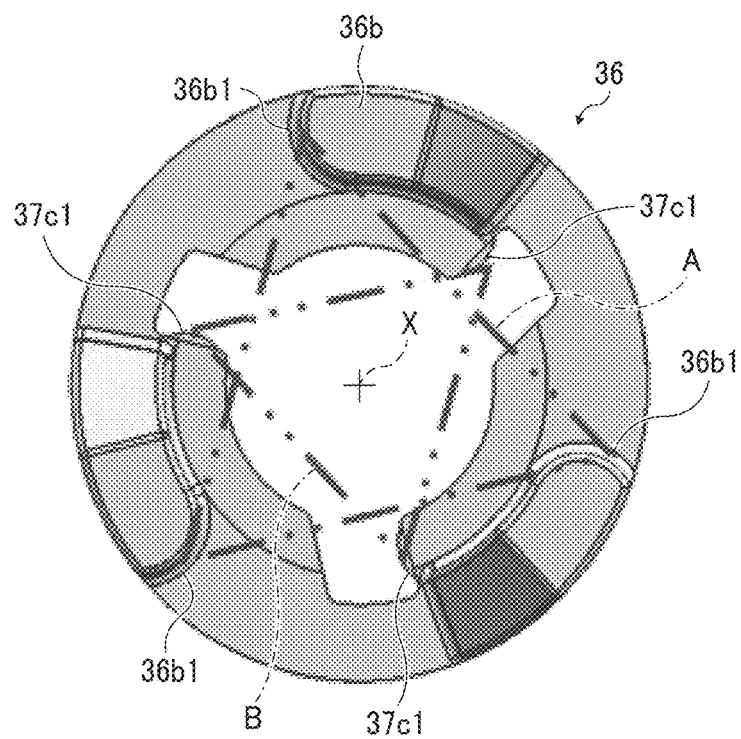
FIG. 13B is a diagram illustrating first and second virtual polygons formed by the first and second drive transmitting portions.

FIG. 13B is a diagram illustrating a first virtual polygon formed by the first drive transmitting portion and a second virtual polygon formed by the second drive transmitting portion.

Referring to FIG. 13A, in the drive device 30 according to the present embodiment, a distance M from the second drive transmitting portion 36b1, in which the drive coupling 36 and the driven coupling 26 are in contact with each other, to the axial center X of the rotary shaft 35 is longer than a distance N from the first drive transmitting portion 37c1, in which the relay member 37 and the drive coupling 36 are in contact with each other, to the axial center X of the rotary shaft 35 (M>N).

Specifically, in the present embodiment, when the relay member 37 is compactly inserted in the opening 36a of the drive coupling 36, so that the portion in which the driving force is transmitted from the relay member 37 to the drive coupling 36 is included in the portion in which the driving force is transmitted from the drive coupling 36 to the driven coupling 26.

Due to such a configuration, even if the drive coupling 36 and the relay member 37 are not increased in size in the axial direction, sufficient force to be radially applied decreases the force applied to the portions in which the driving force is applied to the relay member 37 and the drive coupling 36 and increases the durability of the drive coupling 36 and the relay member 37.

Referring to FIG. 13A, in the drive device 30 according to the present embodiment, three or more of the first drive transmitting portions 37c1 and three or more of the second drive transmitting portions 36b1 are formed radially about the axial center X by an equal number as each other. To be specific, in the present embodiment, when viewed in the axial direction, three first drive transmitting portions 37c1 and three second drive transmitting portions 36b1 are formed at equal intervals (intervals of 120 degrees) in the rotational direction.

This configuration achieves well-balanced drive transmission from the relay member 37 to the driven coupling 26 via the drive coupling 36.

Further, with reference to FIG. 13B, in the drive device 30 according to the present embodiment, when viewed in the axial direction, a first virtual polygon B that circumferentially connects the plurality of first drive transmitting portions 37c1 and a second virtual polygon A that circumferentially connects the plurality of second drive transmitting portions 36b1 are similar figures.

With this configuration, as illustrated in FIG. 13B, the rotational directions of the first drive transmitting portions 37c1 and the second drive transmitting portions 36b1 are arranged with the positions (phases) being shifted from each other, so that this configuration achieves well-balanced drive transmission from the relay member 37 to the driven coupling 26 via the drive coupling 36.

In particular, with reference to the configuration of the present embodiment illustrated in FIG. 13B viewed in the axial direction, the first virtual polygon B and the second virtual polygon A are in a relation of positions rotated by 180 degrees from each other. Due to such a configuration, even when the axis misalignment occurs to incline the posture of the drive coupling 36, the axial reaction force generated in the drive coupling 36 is reduced. In particular, by changing the sizes of the first virtual polygon B and the second virtual polygon A, the drive device 30 provides space for expansion and contraction of the compression spring 38 while keeping the size of the drive device 30 compact and reduces the fitting failure in the drive device 30.

Figure 14A:
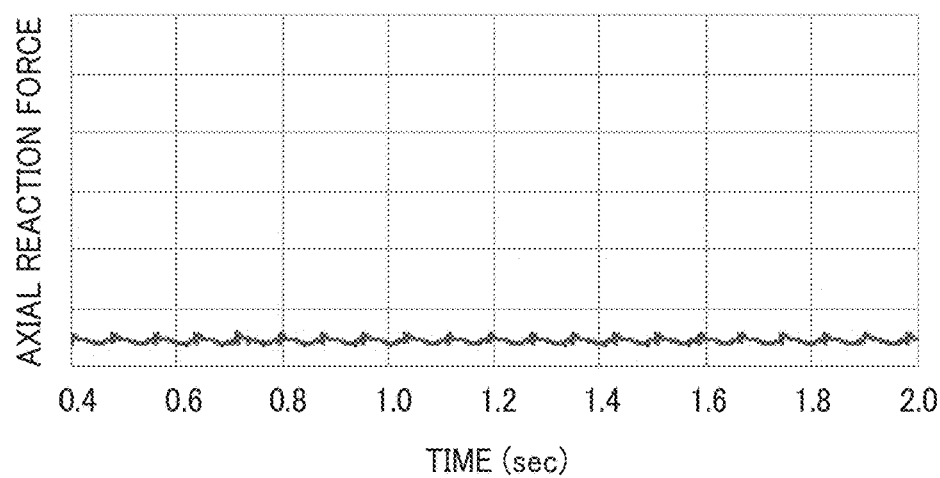
FIGS. 14A, 14B, and 14C are graphs, each illustrating a time change of an axial reaction force generated in the drive device.
Figure 14B:
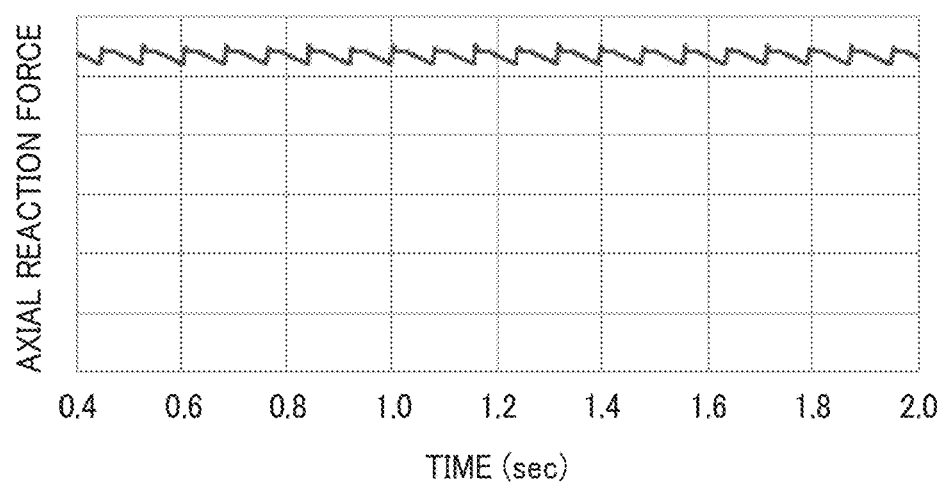
Figure 14C:
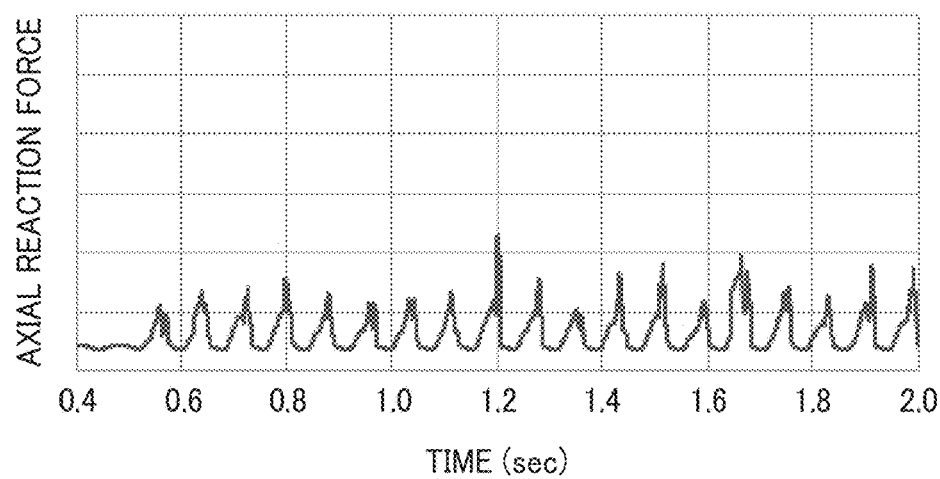

FIGS. 14A, 14B, and 14C are graphs, each illustrating a time change of an axial reaction force generated in the drive coupling 36 of the drive device 30.

Figure 15:
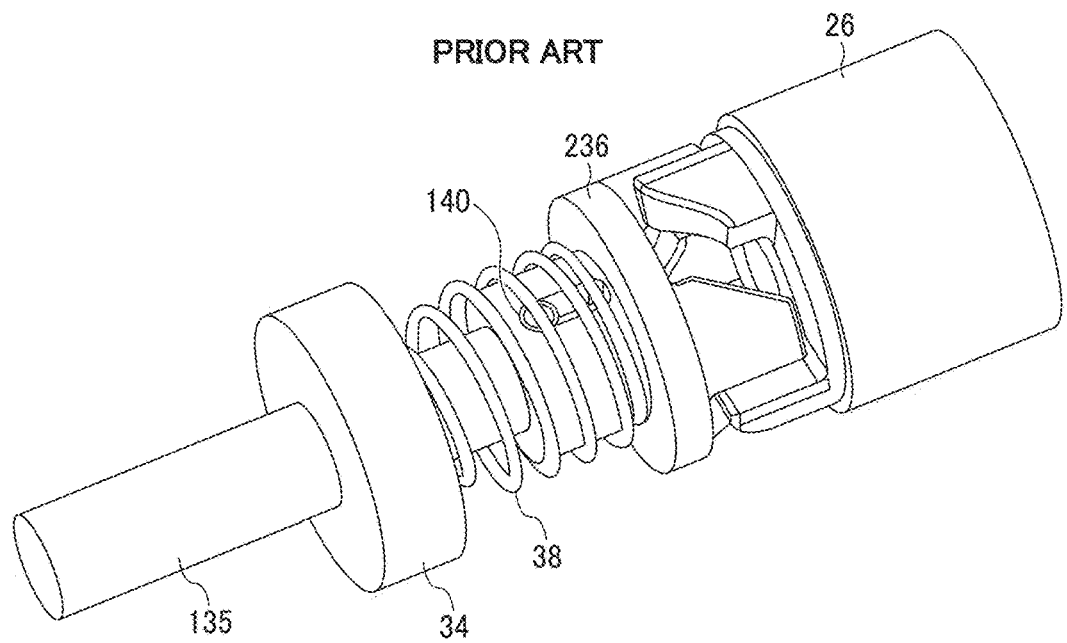
FIG. 15 is a perspective view of the main part of a drive device as a comparative example.

FIG. 15 is a perspective view of the main part of a drive device as a comparative example.

Figure 16:
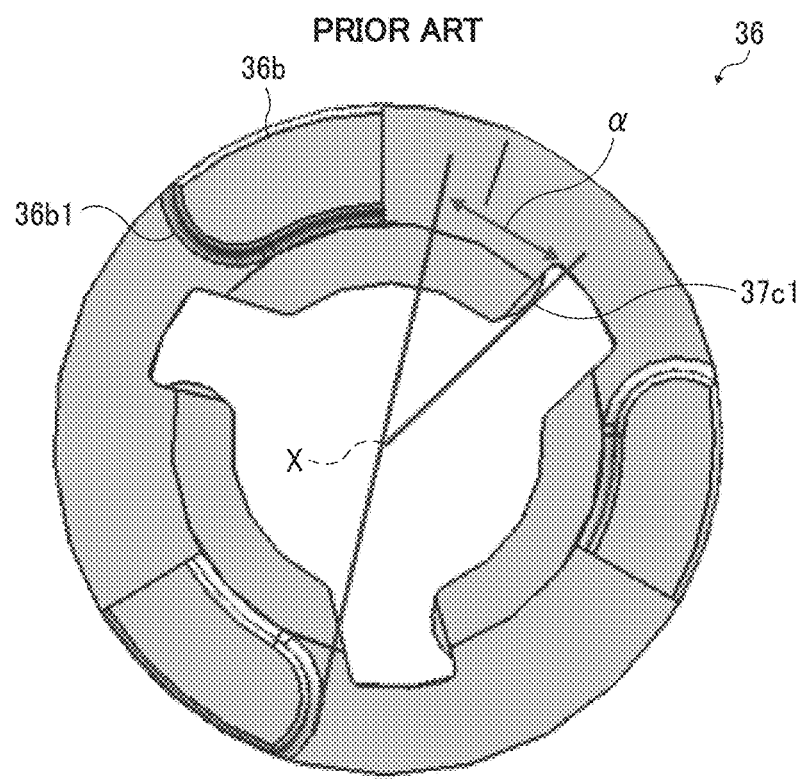
FIG. 16 is a front view of the main part of a drive device as another comparative example.

FIG. 16 is a front view of the main part of a drive device as another comparative example.

Specifically, FIGS. 14A, 14B, and 14C are graphs, each providing a result of an experiment conducted by the inventor of the present disclosure to confirm the effect of the configuration of the drive device 30 described with reference to FIGS. 13A and 13B.

The drive coupling is to transmit the rotation force as it is during the drive transmission. However, in actual use, a deviation of the axial center due to mechanical variations occurs between the driven coupling on the detachable unit and the drive coupling on the housing 100A of the image forming apparatus. Even when such axial misalignment occurs, the force generated when the drive coupling and the driven coupling are fitted to each other is to be reduced. However, when the magnitude of such a force or the amount of fluctuation is large, the posture of the detachable unit fluctuates due to the force generated between the detachable unit and the image forming apparatus, and various inconveniences occur. For example, in a case where the detachable unit is the fixing device 20 that conveys a sheet, the conveyance speed of the sheet fluctuates or the sheet is conveyed askew. Further, in a case where the detachable unit is a component that is related to image formation such as a process cartridge, the detachable unit may cause an abnormal image such as an image having unevenness.

FIG. 14B is a graph indicating a time change of the axial reaction force when a drive device as a comparative example includes a drive coupling 236 that transmits the rotation force by a parallel pin 140 mounted on a rotary shaft 135, as illustrated in FIG. 15. In this experiment, an axial misalignment amount of 0.3 mm is given in the fitting of the drive coupling 236 and the driven coupling 26.

On the other hand, FIG. 14A is a graph indicating a time change of the axial reaction force when the drive device 30 according to the present embodiment is used. Similar to the time change in the graph of FIG. 14B, the time change in the graph of FIG. 14A has the amount of misalignment of the axial center of 0.3 mm and the drive device 30 drives at the same number of rotations with the same load.

From the experimental results of FIGS. 14A and 14B, it is found that the drive device 30 according to the present embodiment significantly reduces the axial reaction force (about one eight of reduction) when compared with the drive device illustrated in FIG. 15. Further, the variation amount of the axial reaction force (i.e., the difference between the maximum value and the minimum value) is reduced to about 70%.

FIG. 14C is a graph of a time change of the axial reaction force using another drive device as another comparative example illustrated in FIG. 16 when the position of each of the first drive transmitting portions 37c1 in the rotational direction is shifted by an angle of 30 degrees (indicated by an angle α in FIG. 16) from the position of each of the first drive transmitting portions 37c1 illustrated in FIG. 13. Similar to the time change in the graph of FIGS. 14A and 14B, the time change in the graph of FIG. 14C has the amount of misalignment of the axial center of 0.3 mm and the drive device of FIG. 16 drives at the same number of rotations with the same load. From the experimental results of FIGS. 14A and 14C, it is found that, under the conditions described with reference to FIGS. 13A and 13B, the first drive transmitting portions 37c1 and the second drive transmitting portions 36b1 of the drive device 30 according to the present embodiment significantly reduces the amount of variation (difference between the maximum and minimum values) of the axial reaction forces. The experimental results proves that the drive device 30 according to the present embodiment provides smooth drive transmission with less rotational unevenness.

Note that the relay member 37 according to the present embodiment is formed of a metallic material and is fixed to the rotary shaft 35 by, e.g., press-fitting. When the relay member 37 is formed of a resin material, a retaining ring such as an E-ring is to be provided so that the relay member 37 does not fall off from the rotary shaft 35. On the other hand, when the relay member 37 is formed of a metal material, no retaining ring is to be provided. As a result, the number of components is reduced and space saving is achieved.

Further, in the present embodiment, the drive coupling 36 is formed of a resin material having excellent sliding performance, so that the axial reaction force does not increase even if the axial center deviates.

First Modification

Figure 17:
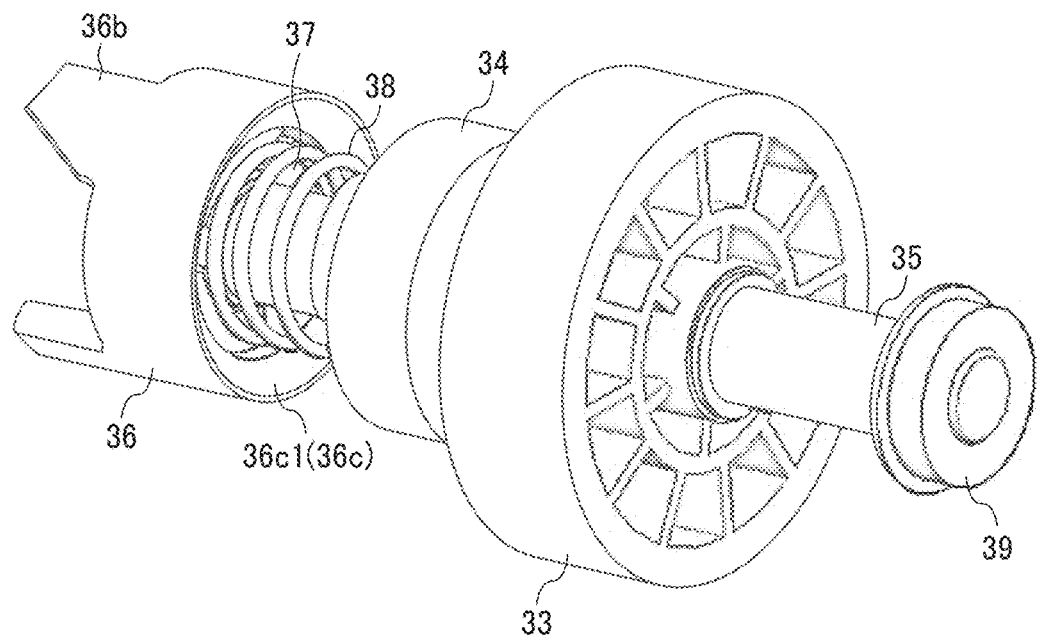
FIG. 17 is a perspective view of the main part of a drive device according to a first modification.

FIG. 17 is a perspective view of the main part of a drive device according to a first modification.

As illustrated in FIG. 17, the drive device 30 according to the first modification includes the drive coupling 36 having the outer circumference side restrictor 36c. The outer circumference side restrictor 36c has a sloped face 36c1 on the one axial end (end portion of the outer circumference side restrictor 36c away from the driven coupling 26). The sloped face 36c1 is formed to gradually increase from the opposite axial end to the one axial end of the outer circumference side restrictor 36c of the drive coupling 36.

Specifically, when viewed in a cross-section including the axial center X of the rotary shaft 35, the outer circumference side restrictor 36c is not parallel to the axial center X but is inclined to be a tapered shape.

As described above, by providing the sloped face 36c1 on the one axial end of the outer circumference side restrictor 36c, when the compression spring 38, the drive coupling 36, and the relay member 37 are assembled to the rotary shaft 35, the compression spring 38 contacts a desired contact portion 37d while being guided by the sloped face 36c1, thereby enhancing the assembly properties of the drive device 30.

Second Modification

Figure 18:
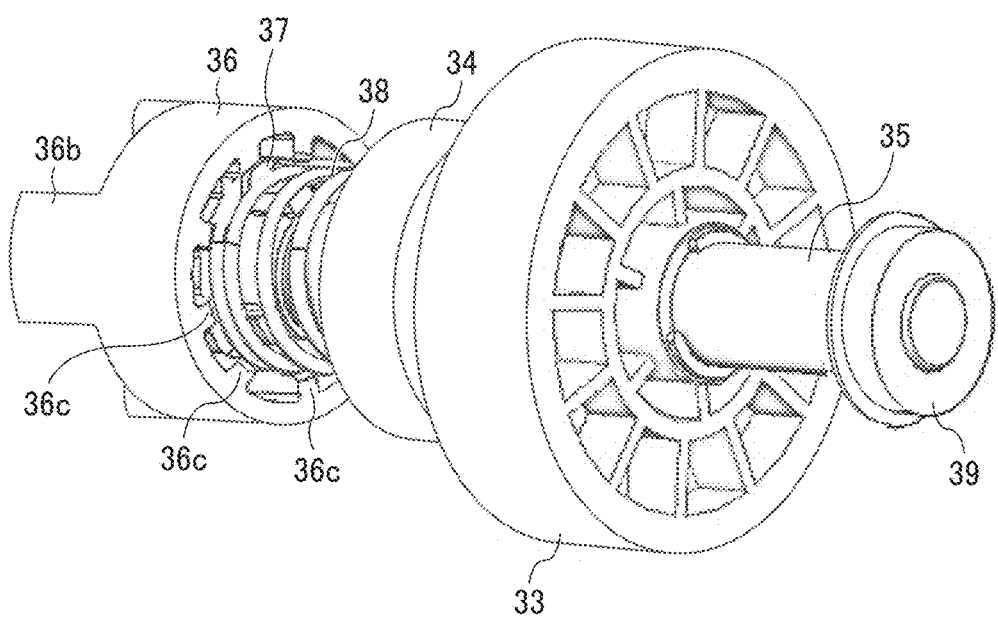
FIG. 18 is a perspective view of the main part of a drive device according to a second modification.

FIG. 18 is a perspective view of the main part of a drive device according to a second modification.

As illustrated in FIG. 18, in the drive device 30 according to the second modification, the outer circumference side restrictor 36c of the drive coupling 36 is formed in a rib shape that extends in the axial direction.

Specifically, when viewed in a cross-section orthogonal to the axial direction of the rotary shaft 35, the outer circumference side restrictor 36c is not formed in a flat, circular shape but is formed in an embossed, circular shape.

Since the drive coupling 36 is formed of a resin material as described above, the drive coupling 36 is formed into an appropriate lightening shape in consideration of a manufacturing process by molding. In a case where such a lightening shape is imparted to the outer circumference side restrictor 36c, the outer circumference side restrictor 36c of the drive coupling 36 is formed in the above-described rib shape to maintain the function of the outer circumference side restrictor 36c.

Third Modification

Figure 19A:
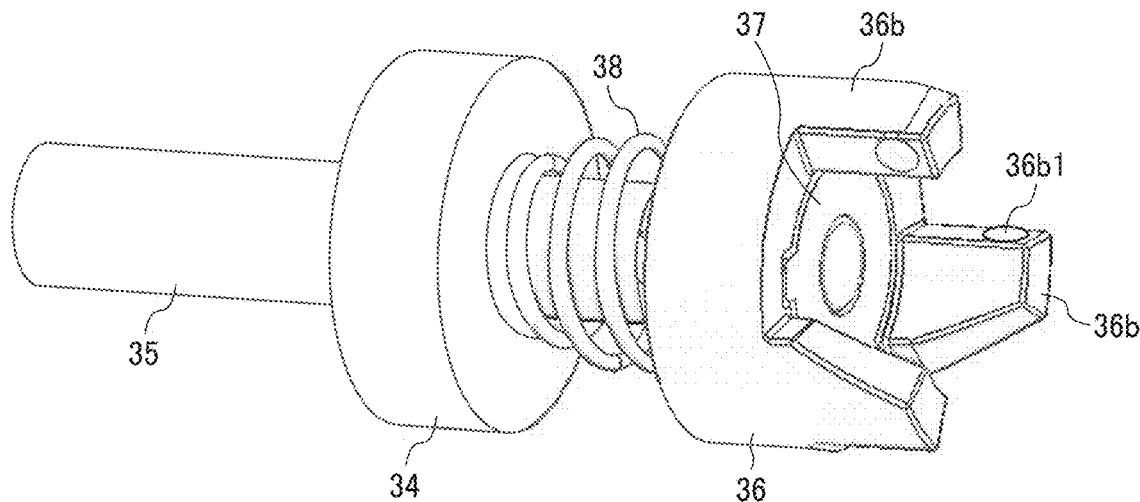
FIG. 19A is a perspective view of the main part of a drive device as a third modification.

FIG. 19A is a perspective view of the main part of a drive device as a third modification.

Figure 19B:
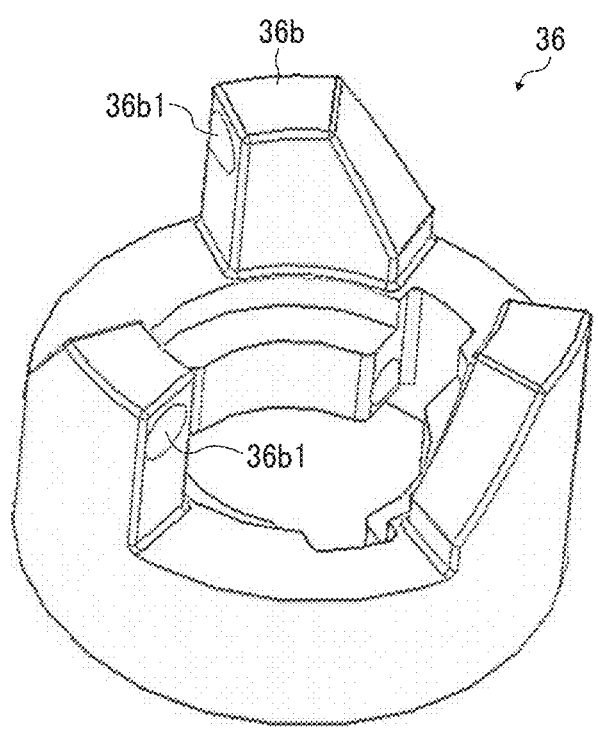
FIG. 19B is a perspective view of a drive coupling of the drive device of FIG. 19A.

FIG. 19B is a perspective view of a drive coupling of the drive device of FIG. 19A.

As illustrated in FIGS. 19A and 19B, in the drive device 30 according to the third modification, the second drive transmitting portion 36b1 is a portion where the drive coupling 36 and the driven coupling 26 make point contact to with each other. Specifically, the claw 36b of the drive coupling 36 and the claw 26b of the driven coupling 26 are to make point contact with each other instead of making line contact with each other. To be more specific, in the third modification, the second drive transmitting portion 36b1 of the claw 36b of the drive coupling 36 has a semispherical face, and the drive transmission object portion 26b1 of the claw 26b of the driven coupling 26 has a flat face. As a result, the frictional resistance caused by contact of the claw 26b of the driven coupling 26 and the claw 36b of the drive coupling 36 is further reduced, and the rotation force (driving force) is efficiently transmitted from the drive coupling 36 to the driven coupling 26.

In the third modification, the first drive transmitting portion 37c1 is a portion where the relay member 37 and the drive coupling 36 make line contact with each other. However, similar to the second drive transmitting portion 36b1, the first drive transmitting portion 37c1 may be a portion where the relay member 37 and the drive coupling 36 make point contact with each other. In this case, the frictional resistance caused by contact of the projections 37c of the relay member 37 and the side faces of the small-diameter portions 36d of the drive coupling 36 is reduced, and the rotation force (driving force) is efficiently transmitted from the relay member 37 to the drive coupling 36.

Fourth Modification

Figure 20:
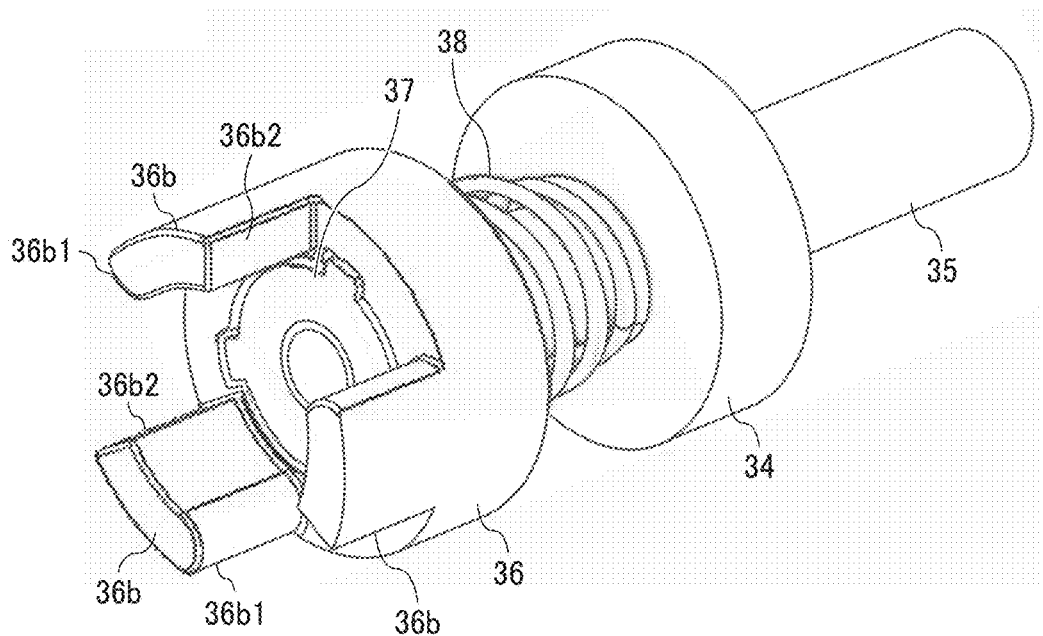
FIG. 20 is a perspective view of the main part of a drive device as a fourth modification.

FIG. 20 is a perspective view of the main part of a drive device as a fourth modification.

As illustrated in FIG. 20, in the drive device 30 according to the fourth modification, each of the claws 36b of the drive coupling 36 is formed so that the side face on the opposite end of the drive device 30 in the rotational direction is also used as the drive transmitting portion 36b2, separately from the second drive transmitting portion 36b1 on the side face on the one end of the drive device 30 in the rotational direction.

That is, when the drive motor 31 of the drive device 30 rotates forward, the driving force is transmitted from the drive coupling 36 to the driven coupling 26 via the second drive transmitting portion 36b1 on one end of the claw 36b in the rotation direction, and when the drive motor 31 of the drive device 30 rotates backward, the driving force is transmitted from the drive coupling 36 to the driven coupling 26 via the drive transmitting portion 36b2 on the opposite end of the claw 36b in the rotation direction. In other words, when the drive motor 31 of the drive device 30 rotates forward or backward, the driving force is normally transmitted from the drive coupling 36 to the driven coupling 26.

Similarly, in the relation of the relay member 37 and the drive coupling 36, when the drive motor 31 of the drive device 30 rotates forward or backward, the driving force is normally transmitted from the relay member 37 to the drive coupling 36.

With such a configuration, the fixing device 20 (detachable unit) is driven in forward and reverse directions by the drive device 30, providing a wider range of operation modes of the fixing device 20.

Fifth Modification

Figure 21:
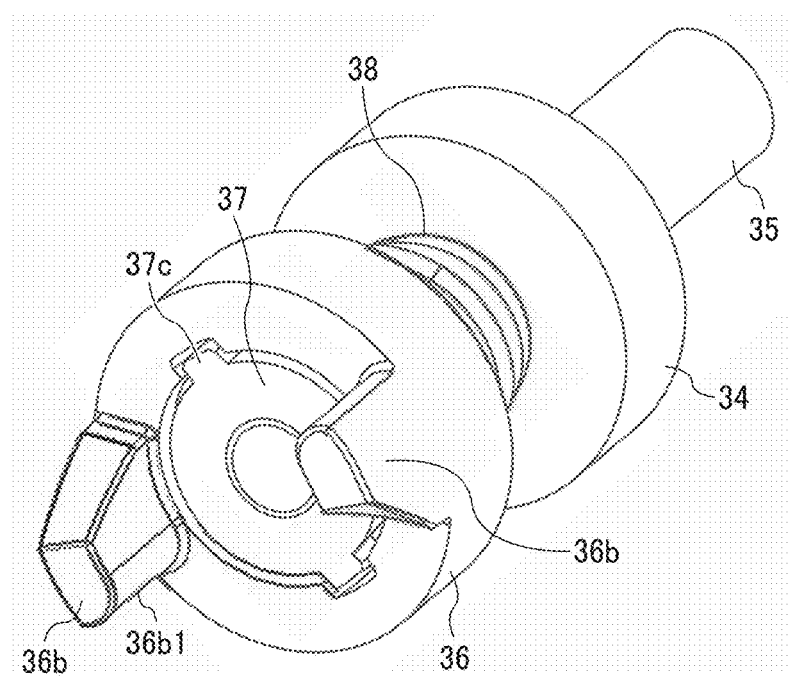
FIG. 21 is a perspective view of the main part of a drive device as a fifth modification.

FIG. 21 is a perspective view of the main part of a drive device as a fifth modification.

As illustrated in FIG. 21, in the drive device 30 according to the fifth modification, two claws 36b of the drive coupling 36 has two claws are provided instead of three claws 36b and two projections 37c of the relay member 37 are provided instead of three projections 37c. In addition, two claws (e.g., two claws 26b) of the driven coupling 26 are provided in accordance with the two claws 36b of the drive coupling 36 in FIG. 21.

Further, the two claws 36b of the drive coupling 36 are disposed at positions shifted by 180 degrees in the rotational direction, and the two projections 37c of the relay member 37 are also disposed at positions shifted by 180 degrees in the rotational direction.

Further, the two claws 36b of the drive coupling 36 and the two projections 37c of the relay member 37 have a relations of positions in which the phases of the claws 36b and the projections 37c are shifted from each other by 180 degrees in the rotational direction.

Even with this configuration, the drive device 30 does not increase in size and cost and is less likely to cause the fitting failure of the drive coupling 36 and the driven coupling 26.

As described above, the drive device 30 according to the present embodiment drives the fixing device 20 (detachable unit) that is detachably attached to the housing 100A of the image forming apparatus 100. The drive device 30 includes the drive coupling 36 that contacts with or separates from the driven coupling 26 of the fixing device 20 along with attachment and detachment of the fixing device 20 with respect to the housing 100A of the image forming apparatus 100. In addition, the relay member 37 is fixedly mounted on the rotary shaft 35 to be inserted into the opening 36a of the drive coupling 36 and transmits the rotation force of the rotary shaft 35 to the drive coupling 36, so that the drive coupling 36 rotates together with the rotary shaft 35. The compression spring 38 is wound around the rotary shaft 35. The one axial end of the compression spring 38 is in contact with the bearing 34 (contact member) disposed at a position farther from the driven coupling 26 than the relay member 37, and the opposite axial end of the compression spring 38 is in contact with the relay member 37. The drive coupling 36 is biased by the compression spring 38 to the opposite axial end when the drive coupling 36 moves toward the one axial end to the relay member 37. The drive coupling 36 also has the outer circumference side restrictor 36c disposed facing the outer circumference of the compression spring 38 to restrict movement of the compression spring 38 in the radial direction. Further, the relay member 37 has an inner circumference side restrictor 37e disposed facing the inner circumference of the compression spring 38 to restrict movement of the compression spring 38 in the radial direction.

Due to such a configuration, the drive device 30 does not increase in size and cost and is less likely to cause the fitting failure of the drive coupling 36 and the driven coupling 26.

In the present embodiment, the bearing 34 is used as a contact member that contacts one axial end of the compression spring 38. However, the contact member is not limited to the bearing 34 and may be, for example, a retaining ring.

Further, the present embodiment employs the fixing device 20 as a detachable unit. However, embodiments of the present invention are not limited to the above-described detachable unit. For example, the process cartridges 6Y, 6M, 6C, and 6K each may serve as a detachable unit, and the present invention may be applied to a drive device that drives the process cartridges 6Y, 6M, 6C, and 6K each serving as a detachable unit (see FIGS. 1 and 2). Further, in the present embodiment, the image forming apparatus 100 is employed as an image forming apparatus to which the present invention is applied. However, embodiments of the present invention are not limited to the above-described image forming apparatus. In some embodiments, for example, the present invention may be applied to a drive device that is disposed in an apparatus or device that is different from the image forming apparatus. Further, even when the above-described sheet separation devices are applied, these sheet separation devices achieve the same effect as the effect provided by the configuration(s) in the present embodiment.

Note that embodiments of the present disclosure are not limited to the above-described embodiments and it is apparent that the above-described embodiments can be appropriately modified within the scope of the technical idea of the present disclosure in addition to what is suggested in the above-described embodiments. Further, features of components of the embodiments, such as the number, the position, and the shape are not limited the embodiments and thus may be preferably set.

The present disclosure is not limited to specific embodiments described above, and numerous additional modifications and variations are possible in light of the teachings within the technical scope of the appended claims. It is therefore to be understood that, the disclosure of this patent specification may be practiced otherwise by those skilled in the art than as specifically described herein, and such, modifications, alternatives are within the technical scope of the appended claims. Such embodiments and variations thereof are included in the scope and gist of the embodiments of the present disclosure and are included in the embodiments described in claims and the equivalent scope thereof.

The effects described in the embodiments of this disclosure are listed as the examples of preferable effects derived from this disclosure, and therefore are not intended to limit to the embodiments of this disclosure.

The embodiments described above are presented as an example to implement this disclosure. The embodiments described above are not intended to limit the scope of the invention. These novel embodiments can be implemented in various other forms, and various omissions, replacements, or changes can be made without departing from the gist of the invention. These embodiments and their variations are included in the scope and gist of this disclosure and are included in the scope of the invention recited in the claims and its equivalent.

Any one of the above-described operations may be performed in various other ways, for example, in an order different from the one described above.

What is claimed is:

1. A drive device configured to drive a detachable unit detachably attached to an image forming apparatus, the drive device comprising:
 a drive coupling configured to contact and separate from
  a driven coupling of the detachable unit along with movement of attachment and detachment of the detachable unit with respect to the image forming apparatus;
a rotary shaft;
a relay member inserted into an opening of the drive coupling and secured on the rotary shaft,
the relay member being configured to transmit rotation force of the rotary shaft to the drive coupling to cause the drive coupling to rotate together with the rotary shaft;
a contact member disposed away from the driven coupling from the relay member; and
a compression spring wound around the rotary shaft, the compression spring having an axial end contacting the contact member and another axial end contacting the relay member,
the compression spring being configured to bias the drive coupling toward an axial end of the drive coupling in response to movement of the drive coupling toward another axial end of the drive coupling, with respect to the relay member,
the drive coupling including an outer circumferential restrictor, the outer circumferential restrictor facing an outer circumference of the compression spring to restrict radial movement of the compression spring,
the relay member including an inner circumferential restrictor, the inner circumferential restrictor facing an inner circumference of the compression spring to restrict radial movement of the compression spring.

2. The drive device according to claim 1,
wherein the compression spring is configured to contact a contact portion of the relay member without contacting the drive coupling when the drive coupling is engaged with the driven coupling to transmit force from the drive coupling to the driven coupling.

3. The drive device according to claim 2,
wherein the contact portion of the relay member is divided into three or more portions in a circumferential direction about the rotary shaft.

4. The drive device according to claim 1,
wherein the outer circumferential restrictor of the drive coupling has a circular shape to cover said another axial end of the compression spring in the opening.

5. The drive device according to claim 4,
wherein the outer circumferential restrictor has an inner diameter gradually increasing toward an axial end of the outer circumferential restrictor from another axial end of the outer circumferential restrictor.

6. The drive device according to claim 1,
wherein the relay member includes a stopper configured to restrict movement of the drive coupling toward said another axial end of the drive coupling.

7. The drive device according to claim 1,
wherein the relay member includes a first drive transmitting portion configured to contact the drive coupling,
wherein the drive coupling includes a second drive transmitting portion configured to contact the driven coupling, and
wherein a distance from the second drive transmitting portion to an axial center of the rotary shaft is longer than a distance from the first drive transmitting portion to the axial center of the rotary shaft.

8. The drive device according to claim 7,
wherein the relay member includes three or more first drive transmitting portions, including the first drive transmitting portion, provided radially about the rotary shaft,
wherein the drive coupling includes three or more second drive transmitting portions, including the second drive transmitting portion, provided radially about the rotary shaft, and
wherein the three or more first drive transmitting portions are equal in number to the three or more second drive transmitting portions.

9. The drive device according to claim 8,
wherein the relay member includes a plurality of first drive transmitting portions circumferentially connected as a first virtual polygon when viewed from an axial direction of the rotary shaft,
wherein the drive coupling includes a plurality of second drive transmitting portions circumferentially connected as a second virtual polygon when viewed from the axial direction of the rotary shaft, and
wherein the first virtual polygon and the second virtual polygon are similar figures.

10. The drive device according to claim 9,
wherein the first virtual polygon is at a position rotated by 180 degrees with respect to a position of the second virtual polygon, when viewed from the axial direction of the rotary shaft.

11. The drive device according to claim 7,
wherein the relay member and the drive coupling are configured to make line contact or point contact at the first drive transmitting portion, and
wherein the drive coupling and the driven coupling are configured to make line contact or point contact at the second drive transmitting portion.

12. The drive device according to claim 1,
wherein the drive coupling is configured to, in response to movement of the drive coupling toward an axial end of the drive coupling beyond a given distance with respect to the relay member, be biased toward another axial end of the drive coupling by the compression spring.

13. An image forming apparatus comprising:
a housing;
the drive device according to claim 1, the drive device being configured to drive the detachable unit; and
the detachable unit detachably attached to the housing of the image forming apparatus.

14. A drive device configured to drive a detachable unit detachably attached to an image forming apparatus, the drive device comprising:
a drive coupling configured to contact and separate from a driven coupling of the detachable unit along with movement of attachment and detachment of the detachable unit with respect to the image forming apparatus;
a rotary shaft; and
a relay member inserted into an opening of the drive coupling and secured on the rotary shaft,
the relay member being configured to transmit rotation force of the rotary shaft to the drive coupling to cause the drive coupling to rotate together with the rotary shaft,
the relay member including a first drive transmitting portion configured to contact the drive coupling,
the drive coupling including a second drive transmitting portion configured to contact the driven coupling,
a distance from the second drive transmitting portion to an axial center of the rotary shaft being longer than a distance from the first drive transmitting portion to the axial center of the rotary shaft.

15. The drive device according to claim 14,
wherein the relay member includes three or more of first drive transmitting portions, including the first drive transmitting portion, provided radially about the rotary shaft,
wherein the drive coupling includes three or more of second drive transmitting portions, including the second drive transmitting portion, provided radially about the rotary shaft, and
wherein the three or more first drive transmitting portions are equal in number to the three or more second drive transmitting portions.

16. The drive device according to claim 15,
wherein the relay member includes a plurality of first drive transmitting portions circumferentially connected as a first virtual polygon when viewed from an axial direction of the rotary shaft,
wherein the drive coupling includes a plurality of second drive transmitting portions circumferentially connected as a second virtual polygon when viewed from the axial direction of the rotary shaft, and
wherein the first virtual polygon and the second virtual polygon are similar figures.

17. The drive device according to claim 16,
wherein the first virtual polygon is at a position rotated by 180 degrees with respect to a position of the second virtual polygon, when viewed from the axial direction of the rotary shaft.

18. The drive device according to claim 14,
wherein the relay member and the drive coupling are configured to make line contact or point contact at the first drive transmitting portion, and
wherein the drive coupling and the driven coupling are configured to make line contact or point contact at the second drive transmitting portion.

19. The drive device according to claim 14,
wherein the drive coupling is configured to, in response to movement of the drive coupling toward an axial end of the drive coupling beyond a given distance with respect to the relay member, be biased toward another axial end of the drive coupling.

20. An image forming apparatus comprising:
a housing;
the drive device according to claim 14, the drive device being configured to drive the detachable unit; and
the detachable unit detachably attached to the image forming apparatus.

* * * * *